US012593332B2

(12) United States Patent
Zhu

(10) Patent No.: US 12,593,332 B2
(45) Date of Patent: Mar. 31, 2026

(54) METHOD AND APPARATUS FOR INSTRUCTING TO TRANSMIT DATA, COMMUNICATION DEVICE, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 595 days.

(21) Appl. No.: 17/995,268

(22) PCT Filed: Apr. 7, 2020

(86) PCT No.: PCT/CN2020/083568
§ 371 (c)(1),
(2) Date: Sep. 30, 2022

(87) PCT Pub. No.: WO2021/203245
PCT Pub. Date: Oct. 14, 2021

(65) Prior Publication Data
US 2023/0156689 A1      May 18, 2023

(51) Int. Cl.
*H04W 72/1263*      (2023.01)
*H04W 16/14*      (2009.01)
*H04W 72/541*      (2023.01)

(52) U.S. Cl.
CPC ....... *H04W 72/1263* (2013.01); *H04W 16/14* (2013.01); *H04W 72/541* (2023.01)

(58) Field of Classification Search
CPC ............. H04W 72/1263; H04W 16/14; H04W 72/541; H04W 72/0446; H04W 72/30; H04W 74/0808
See application file for complete search history.

(56) References Cited

U.S. PATENT DOCUMENTS

2019/0082426 A1* 3/2019 Liou ..................... H04W 72/23
2019/0089583 A1 3/2019 Islam et al.
2019/0089584 A1 3/2019 Islam et al.
(Continued)

FOREIGN PATENT DOCUMENTS

CN 106160967 A 11/2016
CN 108770064 A 11/2018
(Continued)

OTHER PUBLICATIONS

3GPP TSG RAN WG1 *98bis Chongquing, China, Oct. 14-20, 2019, R1-190202 (Year: 2019).*
(Continued)

*Primary Examiner* — Charles C Jiang
*Assistant Examiner* — Margaret Marie Anderson
(74) *Attorney, Agent, or Firm* — McCoy Russell LLP

(57) ABSTRACT

A method for instructing data transmission on an unlicensed spectrum channel, which is applied to a first communication node, includes: performing channel detection on an unlicensed channel; and in response to detecting that the unlicensed channel is idle, broadcasting first slot format indicator (SFI) information, where the first SFI information is at least used for indicating the transmission direction where the first communication node occupies the unlicensed channel to perform data transmission.

19 Claims, 13 Drawing Sheets

First symbol   Fourth symbol        Xth symbol   (X+3)th symbol

Frequency domain

Occupation time of unlicensed channel

Time domain

Time-frequency domain position at which a second communication node broadcasts second SFI Time-frequency domain position at which a first communication node broadcasts first SFI

(56)                References Cited

U.S. PATENT DOCUMENTS

| | | | | |
|---|---|---|---|---|
| 2020/0045696 A1 * | 2/2020 | Huang | .............. | H04W 72/0446 |
| 2020/0053728 A1 | 2/2020 | Huang et al. | | |
| 2021/0168855 A1 * | 6/2021 | Zhang | .............. | H04W 74/0816 |
| 2022/0116152 A1 * | 4/2022 | Iyer | ...................... | H04L 1/1896 |
| 2022/0123885 A1 * | 4/2022 | Shin | ................. | H04W 72/0446 |

FOREIGN PATENT DOCUMENTS

| | | | | |
|---|---|---|---|---|
| CN | 109075956 A | 12/2018 | | |
| CN | 109314989 A | 2/2019 | | |
| CN | 109392146 A | 2/2019 | | |
| CN | 110351874 A | 10/2019 | | |
| CN | 110784926 A | 2/2020 | | |
| CN | 110831159 A | 2/2020 | | |
| WO | WO-2021027790 A1 * | 2/2021 | ............ | H04W 72/20 |

OTHER PUBLICATIONS

3GPP TSG RAN WG1 Meeting #96, Athens, Greece, Feb. 25-Mar. 1, 2019, R1-1903241, (Year: 2019).*

3GPP TS 38.331 V15.9.0 (Mar. 2020) (Year: 2020).*

3GPP TS 38.213 V15.3.0 (Oct. 2018) (Year: 2018).*

"Report of 3GPP TSG RAN meeting #75," Proceedings of 3GPP TSG RAN meeting #76, ETSI MCC, RP-171409, Jun. 5, 2017, West Palm Beach, California, 189 pages.

"Final Report of 3GPP TSG RAN WG1 #92bis," Proceedings of 3GPP TSG RAN WG1 Meeting #93, MCC Support, R1-1805801, May 21, 2018, Busan, South Korea, 195 pages.

"On DL signals and channels," Proceedings of the 3GPP TSG RAN WG1 Meeting #96, Nokia, Nokia Shanghai Bell, R1-1903241 (rev. of R1-1902436), Feb. 25, 2019, Athens, Greece, 15 pages.

"Discussion on physical DL channel design in unlicensed spectrum," Proceedings of the 3GPP TSG RAN WG1 #98bis, Vivo, R1-1910202, Oct. 14, 2019, Chongqing, China, 2 pages.

* cited by examiner

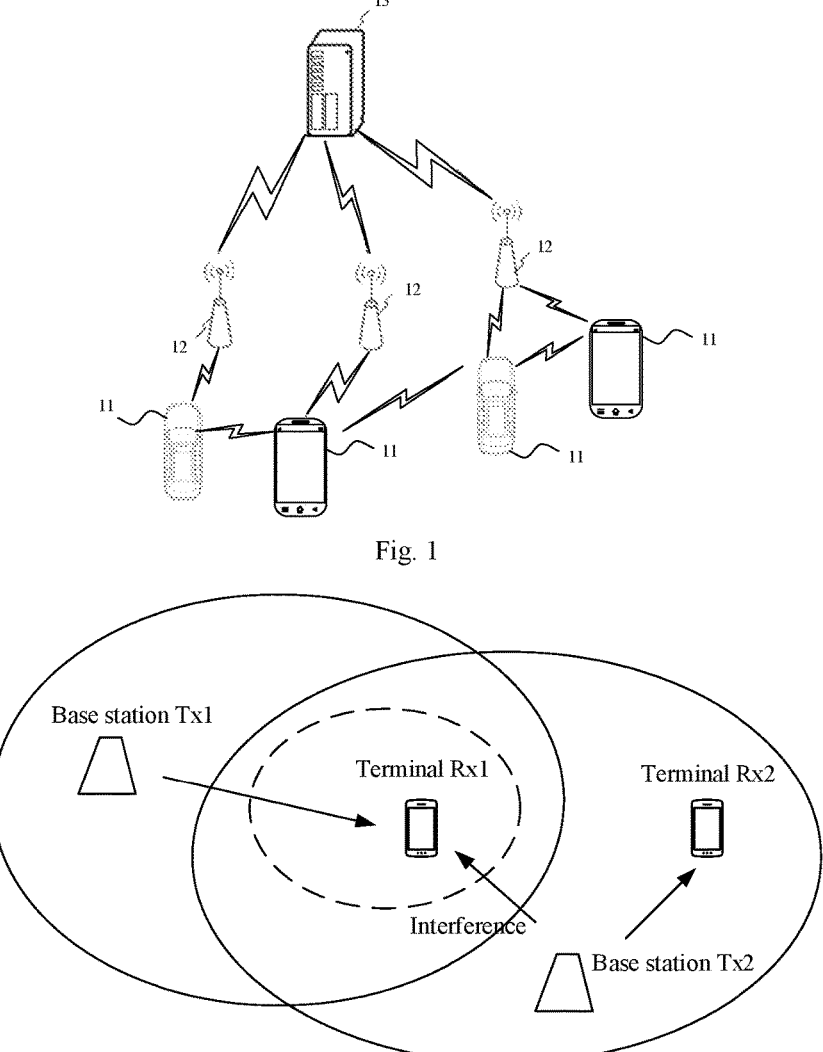
Fig. 1
Fig. 2
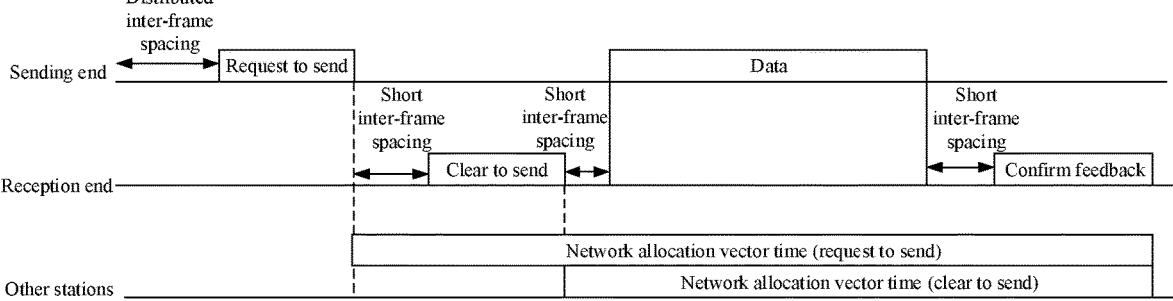
Fig. 3

First communication node

Second communication node

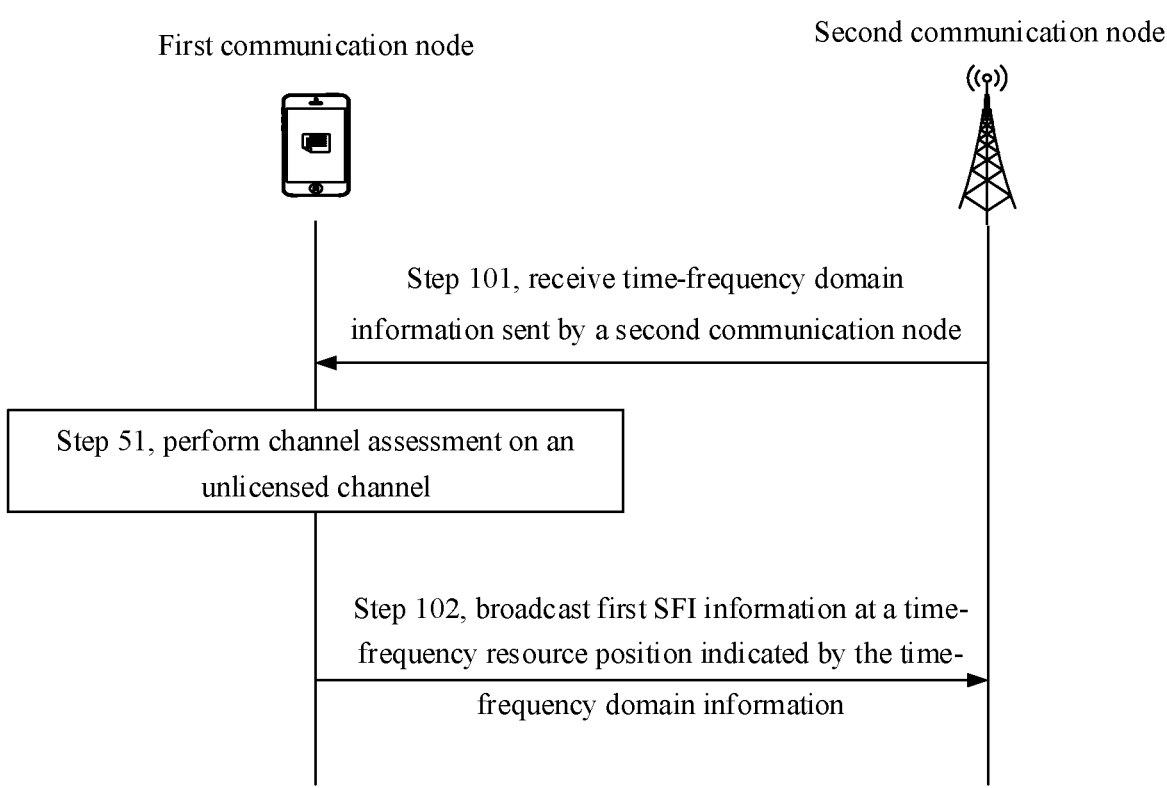

Step 101, receive time-frequency domain information sent by a second communication node Step 51, perform channel assessment on an unlicensed channel Step 102, broadcast first SFI information at a time-frequency resource position indicated by the time-frequency domain information

Fig. 10

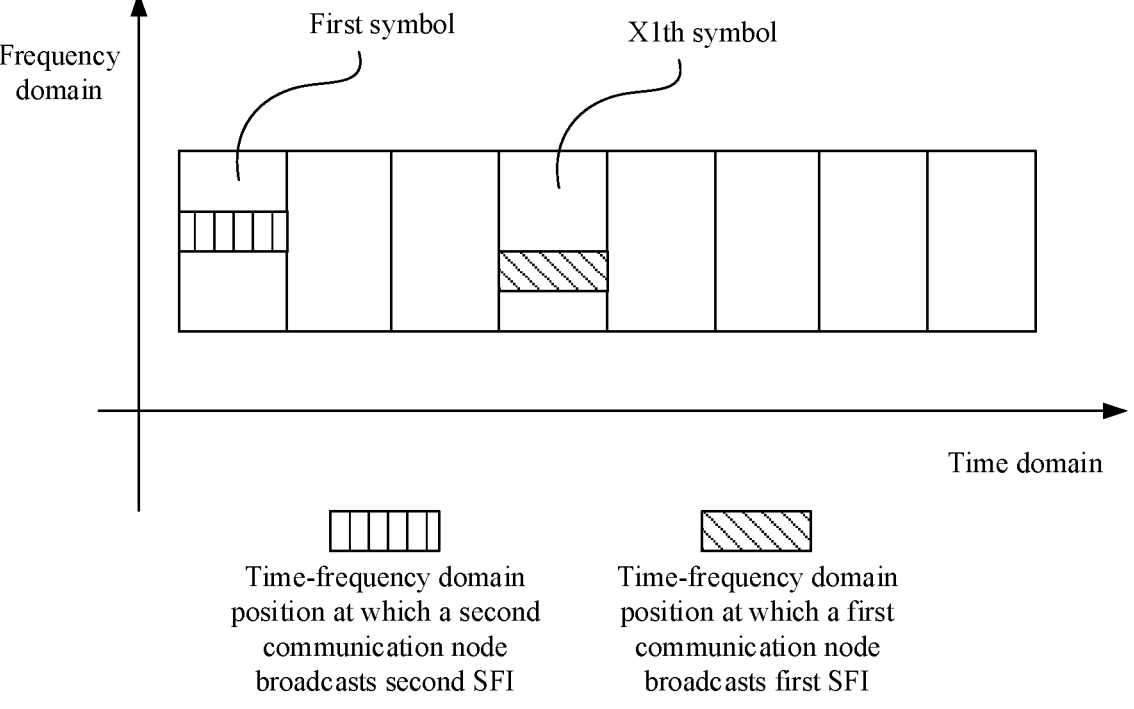

First symbol

X1th symbol

Frequency domain

Time domain

Time-frequency domain position at which a second communication node broadcasts second SFI Time-frequency domain position at which a first communication node broadcasts first SFI

Fig. 10a

First communication node

Other communication nodes

Step 51, perform channel assessment on an unlicensed channel

Step 52, in response to assessing that the unlicensed channel is clear, broadcast first slot format indicator (SFI) information, where the first SFI information is at least used for indicating a transmission direction in which the first communication node occupies the unlicensed channel to perform data transmission Step 141, receive scheduling information sent by a second communication node according to the first SFI information Step 142, in response to the scheduling information includes transmission resources configured for the first communication node, transmit, according to the scheduling information, data on the unlicensed channel

Fig. 14

First communication node

Second communication node

Step 151, receive first SFI information broadcast by the first communication node Step 152, send, according to the first SFI information, scheduling information for scheduling the first communication node to perform data transmission

Fig. 15

First communication node

Second communication node

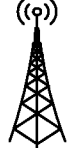

Step 161, in response to occupying an unlicensed spectrum channel, broadcast second SFI information, where the second SFI information is at least used for indicating a transmission direction in which the second communication node occupies an unlicensed channel to perform data transmission Step 162, receive first SFI information at a time domain position determined according to a time domain position at which the second SFI information is broadcast and offset Step 152, send, according to the first SFI information, scheduling information for scheduling the first communication node to perform data transmission

Fig. 16

First communication node

Second communication node

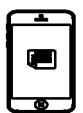

Step 171, send time-frequency domain information

Step 172, receive first SFI information broadcast by the first communication node at a time-frequency resource position indicated by the time-frequency domain information Step 152, send, according to the first SFI information, scheduling information for scheduling the first communication node to perform data transmission

Fig. 17

First communication node          Third communication node

 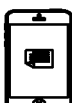

Step 201, receive first SFI information broadcast by the first communication node, where the first SFI information is at least used for indicating a transmission direction in which the first communication node occupies an unlicensed channel to perform data transmission, and the first communication node and the third communication node belong to different cells Step 202, perform, based on the first SFI information, a backoff operation

Fig. 18

First communication node          Third communication node

 

Step 201, receive first SFI information broadcast by the first communication node, where the first SFI information is at least used for indicating a transmission direction in which the first communication node occupies an unlicensed channel to perform data transmission, and the first communication node and the third communication node belong to different cells Step 301, in response to a time period in which a transmission direction indicated by the first SFI information is a downlink transmission direction, not perform a data sending operation; and alternatively, in response to a time period in which a transmission direction indicated by the first SFI information is an uplink transmission direction, not perform a data reception operation

METHOD AND APPARATUS FOR INSTRUCTING TO TRANSMIT DATA, COMMUNICATION DEVICE, AND STORAGE MEDIUM

CROSS REFERENCE TO RELATED APPLICATION

The present application is a U.S. National Phase of International Application No. PCT/CN2020/083568 entitled "METHOD AND APPARATUS FOR INSTRUCTING TO TRANSMIT DATA, COMMUNICATION DEVICE, AND STORAGE MEDIUM," and filed on Apr. 7, 2020. The entire contents of the above-listed application are hereby incorporated by reference for all purposes.

BACKGROUND

The increasing mobile devices and the booming mobile Internet have brought about the exploding mobile data, which on the one hand imposes higher requirements for the performance parameters such as the flow density, network capacity, user rate, and time delay. In order to cope with the challenge, the brand-new radio design has been employed in the 5th-generation (5G) mobile communication new radio (NR), considering new scenarios and new frequency bands. On the other hand, the mobile communication network faces increasing lack of the spectrum resources. The licensed frequency band, especially the highly-valued low-frequency band resource, has limited bandwidth and is being rapidly consumed by growing user groups. The research plan on a new radio based unlicensed frequency band is proposed to cope with the challenge of spectrum shortage and to increase the system capacity.

SUMMARY

Disclosed are a method and apparatus for indicating data transmission on an unlicensed spectrum channel, a communication device, and a storage medium.

In a first aspect, an example of the disclosure provides a method for indicating data transmission on an unlicensed spectrum channel. The method is applied to a first communication node and includes:

performing channel assessment on an unlicensed channel; and in response to assessing that the unlicensed channel is clear, broadcasting first slot format indicator (SFI) information, where the first SFI information is at least used for indicating a transmission direction in which the first communication node occupies the unlicensed channel to perform data transmission.

In a second aspect, an example of the disclosure further provides a method for indicating data transmission on an unlicensed spectrum channel. The method is applied to a second communication node and includes:

receiving first SFI information broadcast by a first communication node; and sending, according to the first SFI information, scheduling information for scheduling the first communication node to perform data transmission.

In a third aspect, an example of the disclosure further provides a method for indicating data transmission on an unlicensed spectrum channel. The method is applied to a third communication node and includes:

receiving first SFI information broadcast by a first communication node, where the first SFI information is at least used for indicating a transmission direction in which the first communication node occupies an unlicensed channel to perform data transmission, and the first communication node and the third communication node belong to different cells; and performing, based on the first SFI information, a backoff operation.

In a fourth aspect, an example of the disclosure further provides a communication device, including:

an antenna;

a memory; and a processor connected to the antenna and the memory separately, configured to control the antenna to receive and send radio signals by executing an executable program stored on the memory, and capable of executing steps of the method provided by any one of the foregoing technical solutions.

In a fifth aspect, an example of the disclosure further provides a non-transitory computer-readable storage medium, storing an executable program, and the executable program implementing steps of the method provided by any one of the foregoing technical solutions when executed by a processor.

BRIEF DESCRIPTION OF THE DRAWINGS

FIG. 1 is a schematic structural diagram of a radio communication system provided in an example of the disclosure.

FIG. 2 is a schematic typical scenario diagram of data transmission provided in an example of the disclosure.

FIG. 3 is a schematic diagram of a mechanism of request to send/clear to send provided in an example of the disclosure.

FIG. 10 is a schematic diagram of a method for indicating data transmission on an unlicensed spectrum channel provided in still another example of the disclosure.

FIG. 10a is a schematic diagram of a method for indicating data transmission on an unlicensed spectrum channel provided in yet another example of the disclosure.

FIG. 14 is a schematic diagram of a method for indicating data transmission on an unlicensed spectrum channel provided in still yet another example of the disclosure.

FIG. 15 is a schematic diagram of a method for indicating data transmission on an unlicensed spectrum channel provided in still yet another example of the disclosure.

FIG. 16 is a schematic diagram of a method for indicating data transmission on an unlicensed spectrum channel provided in still yet another example of the disclosure.

FIG. 17 is a schematic diagram of a method for indicating data transmission on an unlicensed spectrum channel provided in still yet another example of the disclosure.

FIG. 18 is a schematic diagram of a method for indicating data transmission on an unlicensed spectrum channel provided in still yet another example of the disclosure.

FIG. 19 is a schematic diagram of a method for indicating data transmission on an unlicensed spectrum channel provided in still yet another example of the disclosure.

DETAILED DESCRIPTION

Figure 4:
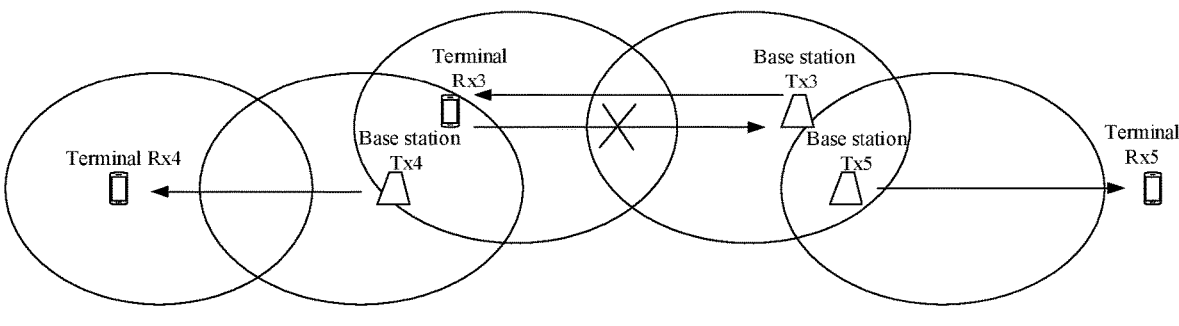
FIG. 4 is a schematic typical scenario diagram of data transmission provided in another example of the disclosure.

The examples will be described in detail here and shown in the accompanying drawings as examples. When the following descriptions relate to the accompanying drawings, unless otherwise indicated, the same numerals in different accompanying drawings denote the same or similar elements. The implementations described in the following examples do not denote all implementations consistent with the examples of the disclosure. On the contrary, they are merely examples of an apparatus and a method consistent with some aspects of the examples of the disclosure as recited in the appended claims.

The terms used in the examples of the disclosure are merely to describe the specific examples, instead of limiting the examples of the disclosure. The singular forms such as "a" and "this" used in the examples of the disclosure and the appended claims are also intended to include the plural forms, unless otherwise clearly stated in the context. It is also to be understood that the term "and/or" used here refers to and includes any of one or more of associated items listed or all possible combinations.

It is to be understood that although the terms first, second, third, etc. may be employed in the examples of the disclosure, to describe various information, these information should not be limited to this. These terms are merely used for distinguishing the same type of information from one another. For example, first information may also be referred to as second information, and similarly, second information may also be referred to as first information, without departing from the scope of the examples of the disclosure. Depending on the context, the word "if", "in case" as used here may be interpreted as "at the time of", "when", or "in response to determining".

Despite a wealth of unlicensed frequency band resources, the listen before talk (LBT) technology based on clear channel assessment (CCA) is introduced into the license assisted access (LAA) in order to guarantee the fair coexistence between different radio access technologies (RATs) using such a frequency band, and it is of importance to introduce LBT into the new radio based unlicensed access (NR-U) in order to guarantee the fair coexistence. However, signal interference between different transmissions still remains in the case of transmitting data based on the LBT technology. Although various backoff mechanisms are introduced to reduce the signal interference between different transmissions, it brings the problem of low utilization rate of radio resources.

The disclosure relates to, but is not limited to, the technical field of radio communication, and in particular to a method and apparatus for indicating data transmission on an unlicensed spectrum channel, a communication device, and a storage medium. In the examples of the disclosure, the channel assessment is performed on the unlicensed channel; and in response to assessing that the unlicensed channel is clear, the first slot format indicator (SFI) information is broadcast, where the first SFI information is at least used for indicating the transmission direction in which the first communication node occupies the unlicensed channel to perform the data transmission. Here, when assessing that the unlicensed channel is clear, the first communication node will broadcast the first SFI information that is at least used for indicating the transmission direction in which the first communication node occupies the unlicensed channel to perform the data transmission. In this way, after receiving the first SFI information broadcast by the first communication node, other communication nodes may acquire the transmission direction in which the first communication node occupies the unlicensed channel to perform the data transmission according to an indicator of the first SFI information. Other communication nodes may transmit data in a transmission direction that does not generate interference based on the transmission direction indicated by the first SFI information in a time period in which the first communication node occupies the unlicensed channel, and perform backoff in a transmission direction that will generate interference. Compared with a manner in which backoff is performed in all transmission directions in all time periods in which the first communication node occupies the unlicensed channel, in a transmission direction in which the first communication node does not perform the data transmission, other communication nodes may also transmit the data through the unlicensed channel, thus improving a utilization rate of radio resources.

FIG. 1 shows a schematic structural diagram of a radio communication system provided in an example of the disclosure. As shown in FIG. 1, the radio communication system is based on a cellular mobile communication technology, and may include: several terminals 11 and several base stations 12.

The terminals 11 may be devices providing voice and/or data connectivity for a user. The terminals 11 may communicate with one or more core networks via a radio access network (RAN). The terminals 11 may be Internet of Things terminals, such as sensor devices, mobile phones (or "cellular" phones), and computers with Internet of Things terminals, for example, stationary, portable, pocket, handheld, intra-computer, or vehicle-mounted apparatuses. For example, the terminals may be a station (STA), a subscriber unit, a subscriber station, a mobile station, a mobile, a remote station, an access point, a remote terminal, an access terminal, a user terminal, a user agent, a user device, or user equipment (UE). Alternatively, the terminals 11 may also be equipment of unmanned aerial vehicles. Alternatively, the terminals 11 may also be vehicle-mounted devices, for example, electronic control units having a radio communication function, or radio communication devices externally connected to the electronic control units. Alternatively, the terminals 11 may also be roadside devices, for example, street lamps, signal lamps, etc. having a radio communication function.

The base stations 12 may be network-side devices in the radio communication system. The radio communication system may be a 4th generation mobile communication technology (4G) system, which is also called a long term evolution (LTE) system. Alternatively, the radio communication system may also be a 5th generation mobile communication technology (5G) system, which is also called a new radio (NR) system or a 5G NR system. Alternatively, the radio communication system may also be a next generation system following the 5G system. An access network of the 5G system may be called a new generation-radio access network (NG-RAN), or a machine-type communication (MTC) system.

Each of the base stations 12 may be an evolved node B (eNB) employed in the 4G system. Alternatively, each of the base stations 12 may be a next generation node B (gNB) employing a centralized-distributed architecture in the 5G system. When employing the centralized-distributed architecture, each of the base stations 12 generally includes a central unit (CU) and at least two distributed units (DUs). The central unit is provided with a protocol stack of a packet data convergence protocol (PDCP) layer, a radio link control (RLC) layer, and a media access control (MAC) layer. Each of the distributed units is provided with a protocol stack of a physical (PHY) layer. Specific implementations of the base stations 12 are not limited in the examples of the disclosure.

A radio connection may be established between the base stations 12 and the terminals 11 through a wireless radio. In different implementations, the wireless radio is based on a standard of the 4th generation mobile communication technology (4G); Or, the wireless radio is based on a standard of the 5th generation mobile communication technology (5G), such as the wireless radio is a new radio. Alternatively, the wireless radio may also be based on a standard of a next generation mobile communication technology following 5G.

In some examples, an end to end (E2E) connection may also be established between the terminals 11. For example, scenarios such as vehicle to vehicle (V2V) communication, vehicle to infrastructure (V2I) communication, and vehicle to pedestrian (V2P) communication in vehicle to everything (V2X) communication are provided.

In some examples, the radio communication system described above may further includes a network management device 13.

Several base stations 12 are each connected with the network management device 13. The network management device 13 may be a core network device in the radio communication system. For example, the network management device 13 may be a mobility management entity (MME) in an evolved packet core (EPC). Alternatively, the network management device 13 may also be another core network device, such as a serving gateway (SGW), a public data network gateway (PGW), a policy and charging rules function (PCRF), or a home subscriber server (HSS), etc. An implementation form of the network management device 13 is not limited in the examples of the disclosure.

In order to facilitate the understanding of the technical solution described in any example of the disclosure, a typical scenario of data transmission is first described in an example. FIG. 2 is a schematic typical scenario diagram of data transmission provided in an example of the disclosure.

As shown in FIG. 2, the radio communication system includes a base station Tx1, a terminal Rx1, a base station Tx2, and a terminal Rx2. In an example, the base station Tx1 is required to send data to the terminal Rx1, and in such a condition, the base station Tx2 is performing downlink transmission to the terminal Rx2. Since the base station Tx1 may not detect the transmission by the base station Tx2, the base station Tx1 transmits the data to the terminal Rx1 after listen before talk (LBT) succeeds. However, in this condition, the transmission by the base station Tx2 may interfere in reception by the terminal Rx1 serving as a reception end. Here, Tx2 is referred to as a hidden node.

In order to solve the hidden node in new radio based unlicensed access (NR-U), an enhanced reception end-assisted LBT may be introduced, for example, a mechanism of request to send (RTS)/clear to send (CTS) in the Institute of Electrical and Electronics Engineers (IEEE) 802.11 is introduced. The sending end and the reception end shake hands by exchanging the request to send and the clear to send, and clear channels around the sending end and the reception end before completing data transmission and corresponding feedback through time fields included in the request to send and the clear to send. As shown in FIG. 3, after sensing that a channel is clear through a carrier, and performing backoff by a distributed inter-frame spacing (DIFS) time, the sending end first sends a request to send to the reception end. A node listening to the request to send around the sending end performs backoff according to a network allocation vector (NAV) time as indicated. The network allocation vector time of the request to send includes a total time required in subsequent sending and feedback processes. After receiving the request to send, the receiving end feeds back a clear to send to the sending end after a short inter-frame spacing of 16 us. Other nodes listening to the clear to send perform backoff according to a network allocation vector time as indicated. The network allocation vector time of the clear to send includes the time from the end of the clear to send to the completion of data sending and a corresponding one-time feedback confirmation.

However, overprotection will be caused after the NR-U directly employs the mechanism of RTS/CTS in IEEE 802.11. After the sending end sends the request to send, if the reception end may not send the clear to send due to channel access failure, the sending end and the reception end fail in handshake. However, the request to send sent by the sending end still enables the surrounding nodes listening to the frame to perform backoff in the network allocation vector time of the request to send. Such a long-time invalid backoff reduces an efficiency of the new radio based unlicensed access.

A typical scenario is as shown in FIG. 4. The radio communication system includes a base station Tx3, a base station Tx4, a base station Tx5, a terminal Rx3, a terminal Rx4, and a terminal Rx5. The base station Tx3 assesses that the channel is clear, and sends a request to send to the terminal Rx3. In such a condition, transmission is being performed between the base station Tx4 and the terminal Rx4. Thus, the terminal Rx3 sensing the transmission is kept in a backoff state. A clear to send may not feedback due to channel access failure, and handshake between the base station Tx3 and the terminal Rx3 fails. However, the request to send sent by the base station Tx3 still inhibits the surrounding base station TX5 listening to the request to send. Thus, the base station Tx5 performs backoff in a network allocation vector time of the request to send, and may not start normal transmission.

A novel new radio signal, that is, channel usage indication (CUI), is introduced in the NR-U, whose function is similar to an RTS/CTS signal in 802.11. Before data transmission, the sending end and the reception end shake hands through the channel usage indication. The channel usage indication includes a field indicating a channel occupation length, so as to make surrounding nodes to perform backoff, and differs from the RTS/CTS signal is that the channel usage indication indicates channel usage information, and specifies whether the sending end or the reception end occupies the channel in a later stage. If sensing channel usage indication for sending, other nodes that are to send data do not perform backoff. On the contrary, if sensing channel usage indication for reception, other nodes perform backoff.

However, the channel usage indication information only indicates a state of sending or reception in a channel occupation time once. However, for cellular communication systems, a sending state and a reception state may be switched from each other. Indicating only one of the states may result in a low resource utilization rate.

Figure 5:
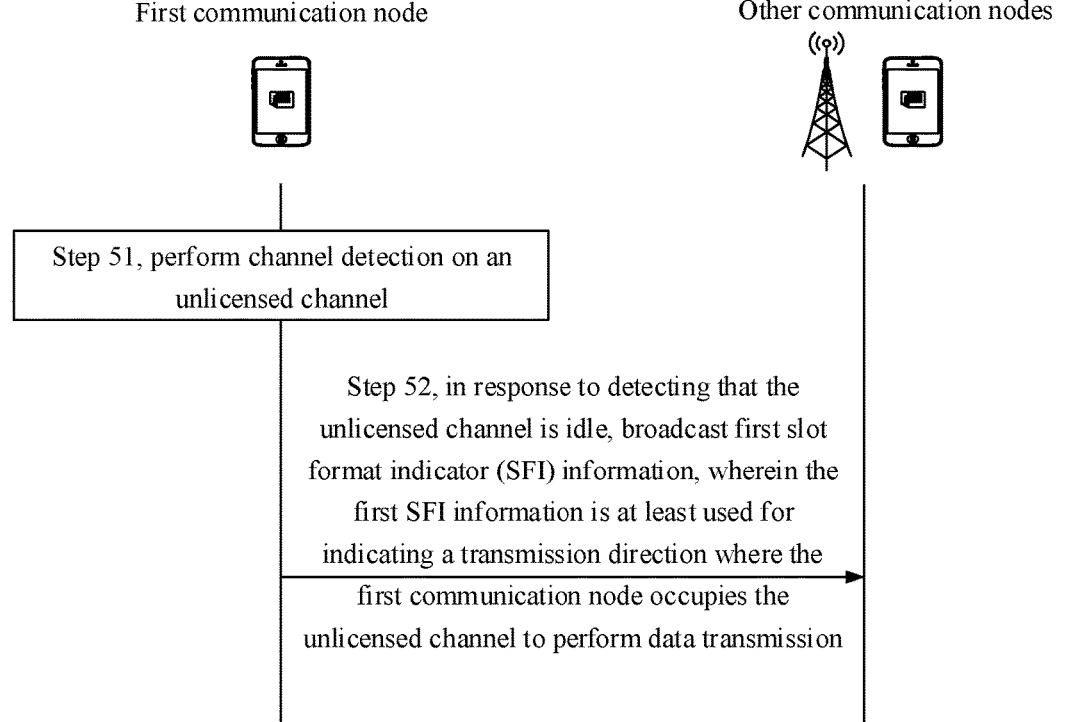
FIG. 5 is a schematic diagram of a method for indicating data transmission on an unlicensed spectrum channel provided in an example of the disclosure.

As shown in FIG. 5, an example of the disclosure provides a method for indicating data transmission on an unlicensed spectrum channel. The method is applied to a first communication node and includes:

Step 51, channel assessment is performed on an unlicensed channel.

In an example, the first communication node may be a terminal. In an example, the terminal may be, but is not limited to, a mobile phone, a wearable device, a vehicle-mounted terminal, a smart home terminal, an industrial sensing device, and/or a medical device, etc.

In an example, the first communication node is a communication node A. When the communication node A uses the unlicensed channel to communicate with a communication node B, it is assessed whether the unlicensed channel is clear. If the unlicensed channel is clear, the communication node A may use the unlicensed channel to wirelessly communicate with the communication node B. If the unlicensed channel is not clear (or is busy), is, for example, occupied by a communication node C, the communication node A may not use the unlicensed channel to wirelessly communicate with the communication node B.

In an example, the step that channel assessment is performed on an unlicensed channel may be to assess a strength of a signal transmitted on the unlicensed channel.

In an example, when it is assessed that the strength of the signal sent on the unlicensed channel is lower than a set signal strength threshold, it may be determined that the assessed unlicensed channel is clear. When it is assessed that the strength of the signal sent on the unlicensed channel is greater than the set signal strength threshold, it may be determined that the assessed unlicensed channel is busy. Here, the signal sent on the unlicensed channel is sent by other communication nodes except the first communication node.

In an example, the unlicensed channel may be a channel, to be used by the communication node, in an unlicensed frequency band. The unlicensed channel may be one or more bandwidth units corresponding to a carrier on the unlicensed frequency band. For example, a bandwidth on the carrier may be 100 MHz, and each bandwidth unit has a bandwidth of 20 MHz. The carrier may include five bandwidth units, and the unlicensed channel may be any one of the five corresponding bandwidth units.

Step 52, in response to assessing that the unlicensed channel is clear, first slot format indicator (SFI) information is broadcast, where the first SFI information is at least used for indicating a transmission direction in which the first communication node occupies the unlicensed channel to perform data transmission.

In an example, when the first communication node assesses that the unlicensed channel is clear, and data to be transmitted between the first communication node and a second communication node are required to be transmitted, the first communication node may determine, according to a transmission direction in which the data to be transmitted are exchanged between the first communication node and the second communication node, the transmission direction indicated by the first SFI information, and send the first SFI information after the first SFI information is generated based on the transmission direction.

In the cellular mobile communication, the transmission direction may be an "uplink" transmission direction, a "downlink" transmission direction, or an "undefined" transmission direction.

In sidelink (SL) communication, the transmission direction may be: a direction of other communication nodes communicating with the first communication node.

In an example, when it is assessed that a strength of a signal sent on the unlicensed channel is lower than a set signal strength threshold, the first slot format indicator (SFI) information is broadcast.

In an example, the first slot format indicator information is used for indicating a transmission direction of some or all of transmission units in which the first communication node occupies the unlicensed channel to perform data transmission.

In an example, some transmission units may be one or more of N transmission units. All the transmission units may be all of the N transmission units. Here, N is a positive integer greater than or equal to 1.

In an example, the first SFI information may indicate a transmission direction identifier of each transmission unit. The transmission direction identifier may be at least one of an "uplink" transmission direction identifier, a "downlink" transmission direction identifier, or an "undetermined" transmission direction identifier. For example, if identifier 1 is the uplink transmission direction identifier, and a transmission direction corresponding to identifier 1 is the uplink transmission direction, it means that a transmission direction of a transmission unit identified by identifier 1 is uplink transmission. If identifier 2 is the downlink transmission direction identifier, and a transmission direction corresponding to identifier 2 is the downlink transmission direction, it means that a transmission direction of a transmission unit identified by identifier 2 is downlink transmission. If identifier 3 is the "undetermined" transmission direction identifier, and a transmission direction corresponding to identifier 3 is the "undetermined" transmission direction, it means that a transmission direction of a transmission unit identified by identifier 3 is unknown.

In an example, in order to reduce interference, since some transmission units are required to avoid transmission of some special signals, a transmission direction of these transmission units may not be indicated, and data are not transmitted on these transmission units. Here, the special signal may be a cell reference signal.

In an example, one transmission unit may be, but is not limited to, a slot, a symbol, a sub-frame, and/or a radio frame, etc.

In an example, the transmission direction may be the "uplink" transmission direction, and the "downlink" transmission direction. Here, the "uplink" transmission direction may be an uplink transmission direction of data, and the "downlink" transmission direction may be a downlink transmission direction of data.

In an example, when the transmission direction is the "uplink" transmission direction, the first communication node may send data to the second communication node. When the transmission direction is the "downlink" transmission direction, the first communication node may receive data sent by the second communication node.

In an example, when data transmission is performed on the unlicensed channel, different transmission units may correspond to different transmission directions. For example, a transmission direction, on a first transmission unit, of data is the "uplink" transmission direction, and a transmission direction, on a second transmission unit, of data is the "downlink" transmission direction.

In an example, the first communication node may determine in advance with the second communication node a time-frequency domain position at which the first communication node broadcasts the first SFI information.

In an example, the first slot format indicator information may be broadcast at a time-frequency domain position notified by other communication nodes based on high layer signaling or physical layer signaling.

In an example, the high layer signaling or the physical layer signaling may carry information indicating the time-frequency domain position.

In an example, the high layer signaling may be radio resource control (RRC) signaling, media access control element (MAC CE) signaling, etc.

In an example, the physical layer signaling may be physical downlink control channel (PDCCH) signaling.

In an example, the first communication node is a terminal, and other communication nodes are base stations, and the first slot format indicator information may be broadcast at a time-frequency domain position notified by the base stations based on the RRC signaling.

In the examples of the disclosure, when assessing that the unlicensed channel is clear, the first communication node will broadcast the first SFI information at least used for indicating the transmission direction in which the first communication node occupies the unlicensed channel to perform data transmission. In this way, after receiving the SFI information broadcast by the first communication node, other communication nodes may acquire, according to an indicator of the first SFI information, the transmission direction in which the first communication node occupies the unlicensed channel to perform data transmission. Other communication nodes may transmit data in a transmission direction that does not generate interference based on the transmission direction indicated by the first SFI information in a time period when the first communication node occupies the unlicensed channel, and perform backoff in a transmission direction that will generate interference. Compared with a manner in which backoff is performed in all transmission directions in all time periods when the first communication node occupies the unlicensed channel, other communication nodes may also perform data transmission through the unlicensed channel in a transmission direction in which the first communication node does not perform data transmission, thus improving an utilization rate of radio resources.

Figures 6, 7:
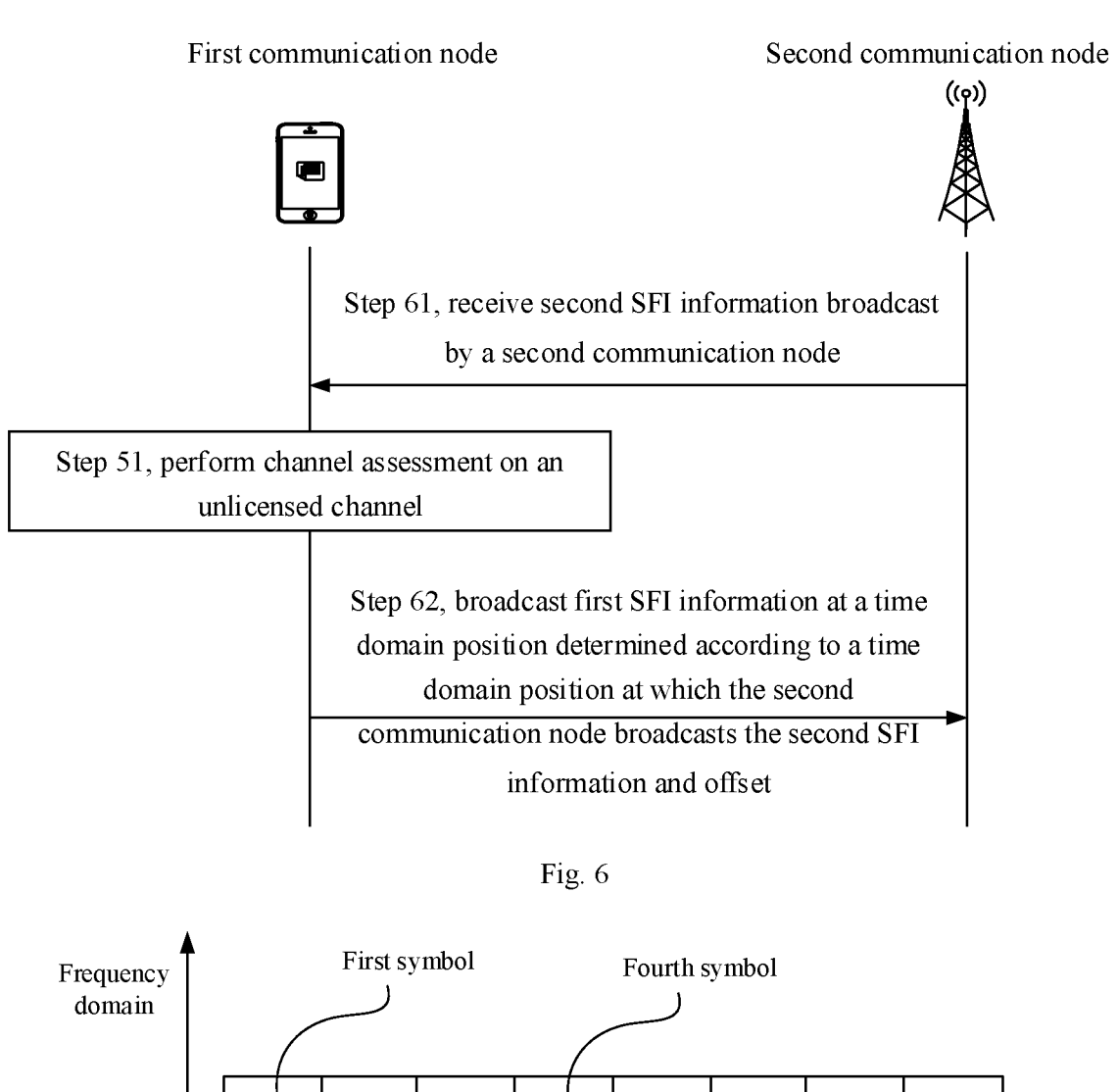
FIG. 6 is a schematic diagram of a method for indicating data transmission on an unlicensed spectrum channel provided in another example of the disclosure.
FIG. 7 is a schematic diagram of a time domain position provided in an example of the disclosure.

As shown in FIG. 6, another example of the disclosure further provides a method for indicating data transmission on an unlicensed spectrum channel. The method further includes:

Step 61, second SFI information broadcast by a second communication node is received.

In an example, the second SFI information indicates a transmission direction of some or all of transmission units in which the second communication node occupies the unlicensed channel to perform data transmission. Here, a first communication node may determine, based on an indicator of the second SFI information, a transmission direction of some or all of transmission units in which the first communication node occupies the unlicensed channel to perform data transmission.

In an example, the second SFI information may indicate an uplink or downlink direction that the second communication node transmits data on N transmission units in a time period occupying the unlicensed channel.

In an example, the second SFI information broadcast by the second communication node is received before the first communication node broadcasts the first SFI information.

In an example, some transmission units may be one or more of N transmission units. All the transmission units may be all of the N transmission units. Here, N is a positive integer greater than or equal to 1.

The step 52 that first slot format indicator (SFI) information is broadcast includes:

Step 62, the first SFI information is broadcast at a time domain position determined according to a time domain position at which the second communication node broadcasts the second SFI information and offset.

In an example, the first communication node may determine in advance with the second communication node a time-frequency domain position at which the second communication node broadcasts the second SFI information.

In an example, the first communication node may determine the offset in advance with the second communication node.

In an example, the offset may be determined by the second communication node (for example, a base station). In an example, the base station determines the offset according to a condition of a transmission channel. In an example, when the transmission channel has a good signal quality, the offset is set as first offset; and when the transmission channel has a poor signal quality, the offset is set as second offset. Here, the first offset is smaller than the second offset. Here, the smaller the offset is, the faster the second communication node may acquire the first SFI information sent by the first communication node.

In an example, the offset may be with respect to the time domain position at which the second communication node broadcasts the second SFI information.

In an example, the first SFI information is broadcast at a time domain position obtained by offsetting the time domain position at which the second communication node broadcasts the second SFI information by the offset.

In an example, the time domain position at which the second communication node broadcasts the second SFI information may correspond to one transmission unit. Here, one transmission unit may be one symbol.

In an example, a time domain position before offsetting is a first time domain position, a time domain position offset by the offset is a second time domain position, and the first time domain position is separated from the second time domain position by a number of transmission units indicated by the offset. Here, one transmission unit may correspond to one symbol.

In an example, with reference to FIG. 7, a transmission unit corresponding to the time domain position at which the second communication node broadcasts the second SFI information is a first symbol. When the offset is 3, a symbol offset by 3 symbols is a fourth symbol, and a transmission unit for broadcasting the first SFI information is the fourth symbol.

In an example, the first SFI information is broadcast in a time window obtained by offsetting the time domain position at which the second communication node broadcasts the second SFI information by the offset. The time window includes at least one candidate time domain position at which the first SFI information is broadcast.

In an example, at least one candidate time domain position may correspond to at least one transmission unit. Here, one transmission unit may be one symbol.

Figure 8:
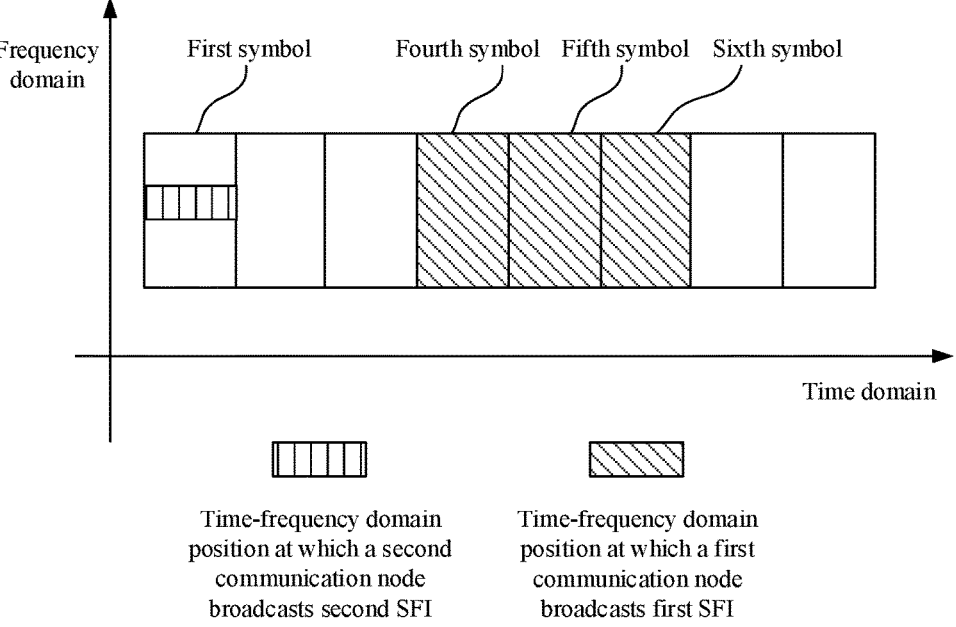
FIG. 8 is a schematic diagram of a time domain position provided in another example of the disclosure.

In an example, with reference to FIG. 8, the time window includes 3 symbols, the transmission unit corresponding to the time domain position at which the second communication node broadcasts the second SFI information is the first symbol, and when the offset is 3, symbols included in the time window offset by 3 symbols are a fourth symbol, a fifth symbol, and a sixth symbol in sequence.

In an example, at least one candidate time domain position includes three time domain positions. When assessing that the unlicensed channel is clear at a first time domain position, the first communication node broadcasts the first SFI information at the first time domain position. When assessing that the unlicensed channel is clear at a second time domain position, the first communication node broadcasts the first SFI information at the second time domain position. When assessing that the unlicensed channel is clear at a third time domain position, the first communication node broadcasts the first SFI information at the third time domain position.

Here, since the first communication node may broadcast the first SFI information at different time domain positions in one time window, compared with a manner in which the first SFI information may only be broadcast at a single time domain position, positions for broadcasting the first SFI information are increased, the situation that the first SFI may not be sent after the time domain position for broadcasting is missed is reduced, and the first SFI information may be broadcast in time.

For example, the first communication node may select, according to a current transmission state and/or communication capability of the first communication node, one or more time domain positions in the time window, to broadcast the first SFI information. For example, if the first communication node has a high transceiving capability and a high transmission power currently, one time domain position may be selected according to the transmission condition for sending.

In an example, the first communication node may select any one of at least one candidate time domain position, to broadcast the first SFI information.

Figure 9:
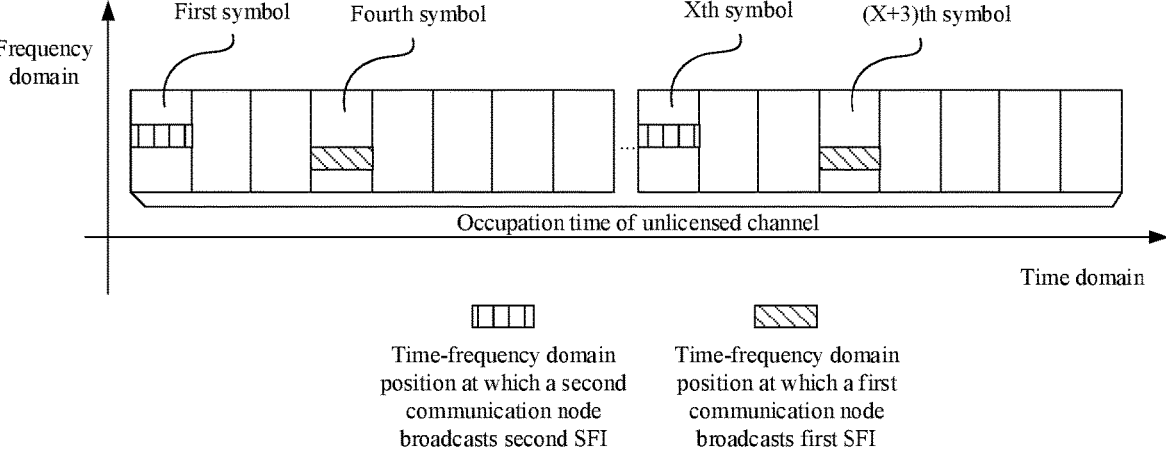
FIG. 9 is a schematic diagram of a broadcasting position provided in an example of the disclosure.

In an example, with reference to FIG. 9, the first communication node may broadcast the first SFI information repeatedly in a time period in which the unlicensed channel is occupied once. As shown in FIG. 9, the first SFI information is broadcast on the fourth symbol and the (X+3)th symbol. X is a positive integer greater than 8.

As shown in FIG. 10, still another example of the disclosure further provides a method for indicating data transmission on an unlicensed spectrum channel. The method further includes:

Step 101, time-frequency domain information sent by a second communication node is received.

In an example, high layer signaling or physical layer signaling carrying time-frequency domain information sent by the second communication node may be received.

In an example, the high layer signaling may be radio resource control (RRC) signaling, media access control element (MAC CE) signaling, etc.

In an example, the physical layer signaling may be physical downlink control channel (PDCCH) signaling.

In an example, the time-frequency domain information includes time domain position information and frequency domain position information.

The step 52 that first slot format indicator (SFI) information is broadcast includes:

Step 102, the first SFI information is broadcast at a time-frequency resource position indicated by the time-frequency domain information.

In an example, with reference to FIG. 10a, the second communication node sends second SFI information on the first symbol, and the time-frequency position information in the time-frequency domain information may indicate any X1th symbol among symbols after the first symbol. In an example, the frequency domain position information in the time-frequency domain information may indicate any sub-carrier corresponding to the X1th symbol. X1 is a positive integer greater than 1.

Figure 10B:
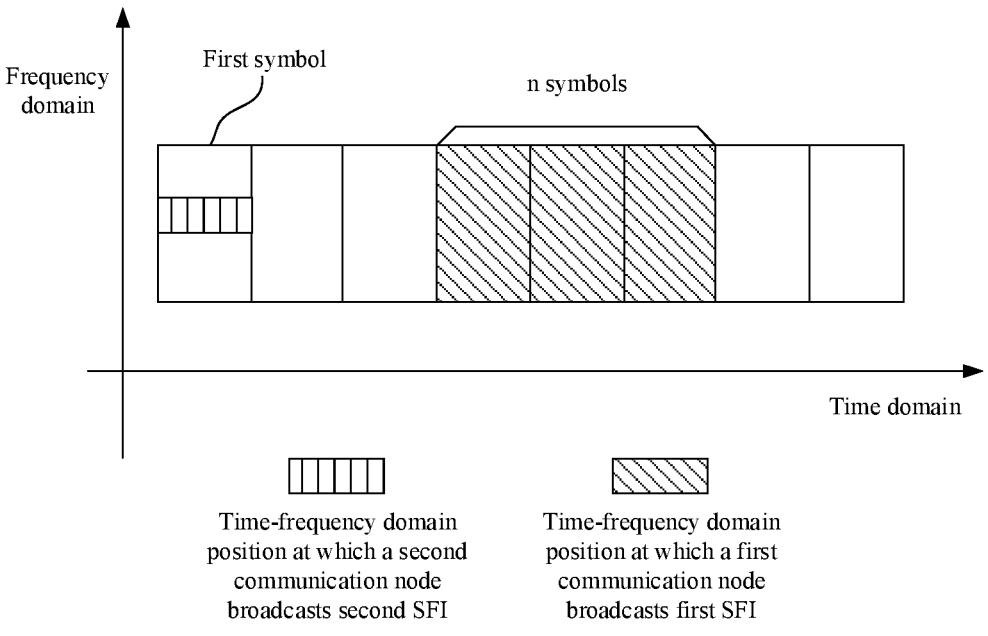
FIG. 10b is a schematic diagram of a method for indicating data transmission on an unlicensed spectrum channel provided in still yet another example of the disclosure.

In an example, with reference to FIG. 10b, the second communication node sends second SFI information on the first symbol, and the time domain position information in the time-frequency domain information may indicate n symbols among symbols after the first symbol. In an example, the frequency domain position information in the time-frequency domain information may indicate any sub-carrier corresponding to each of the n symbols. In an example, n may be n consecutive symbols or n non-consecutive symbols. n is a positive integer greater than 1.

In an example, the time-frequency domain information may be carried in the second SFI information sent by the second communication node to the first communication node.

Figure 11:
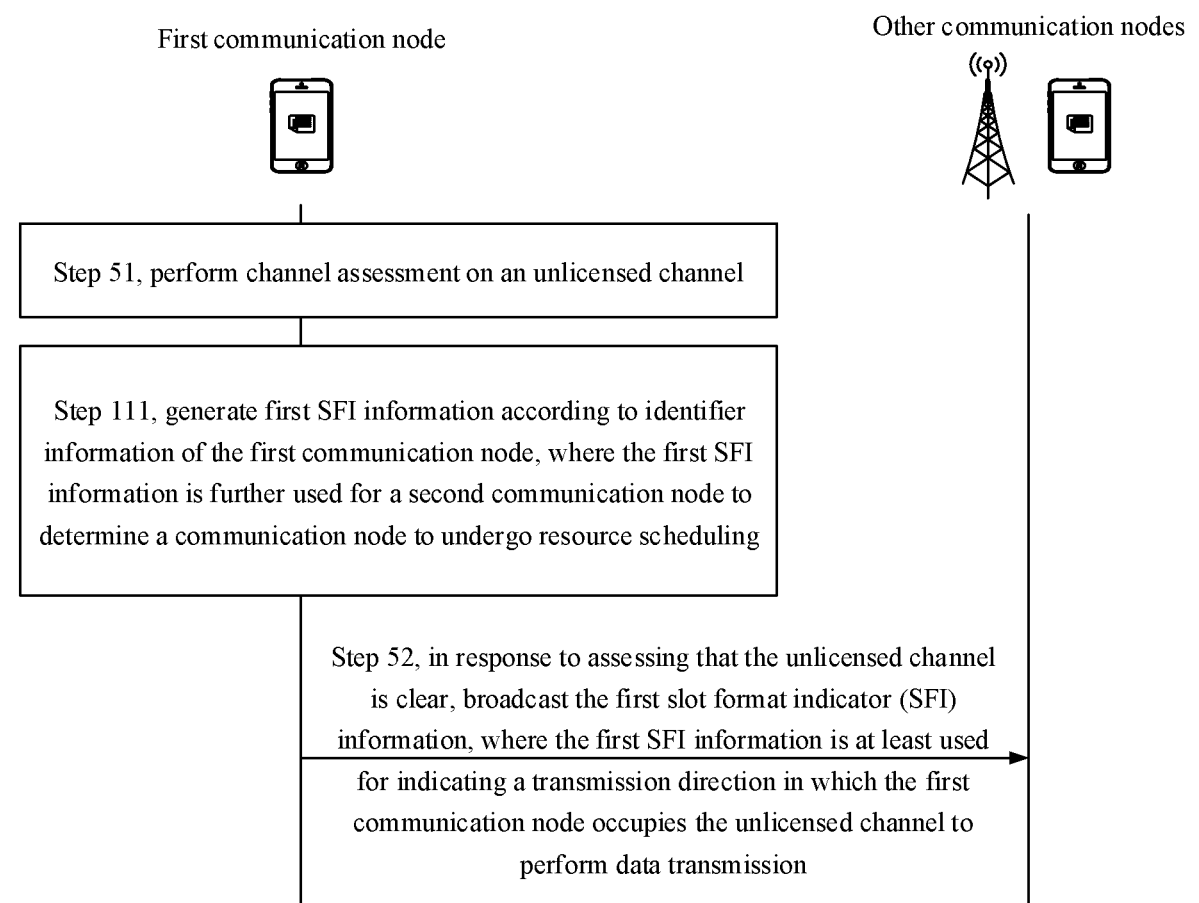
FIG. 11 is a schematic diagram of a method for indicating data transmission on an unlicensed spectrum channel provided in still yet another example of the disclosure.

As shown in FIG. 11, still yet another example of the disclosure further provides a method for indicating data transmission on an unlicensed spectrum channel. The method further includes:

Step 111, first SFI information is generated according to identifier information of a first communication node, where the first SFI information is further used for the second communication node to determine a communication node to undergo resource scheduling.

In an example, the identifier information is used for distinguishing between different communication nodes. For example, an identifier of the first communication node is "001", and an identifier of the second communication node is "010".

In an example, the first SFI information may carry the identifier information of the first communication node. In an example, the identifier of the first communication node may be characterized by a plurality of bits of physical layer signaling carrying the SFI information. For example, the identifier of the first communication node is characterized by 3 bits. When set as "001", the bits characterize the identifier of the first communication node.

In an example, after receiving the first SFI information, the second communication node may determine, based on the identifier information in the first SFI information, to schedule the first communication node to undergo resource scheduling. Here, resource scheduling may be scheduling radio time-frequency domain resources for data transmission.

In an example, the first SFI information includes:

direction information used for indicating a transmission direction in which the first communication node occupies an unlicensed channel to perform data transmission; and In an example, the transmission direction may be an "uplink" transmission direction, or a "downlink" transmission direction. Here, the "uplink" transmission direction may be an uplink transmission direction of data, and the "downlink" transmission direction may be a downlink transmission direction of data.

In an example, when data are transmitted on the occupied unlicensed channel, a transmission direction, on a first transmission unit, of data is the "uplink" transmission direction, and a transmission direction, on a second transmission unit, of data is the "downlink" transmission direction.

identifier information used for indicating the first communication node.

In an example, the identifier information is used for distinguishing between different communication nodes.

Figure 12:
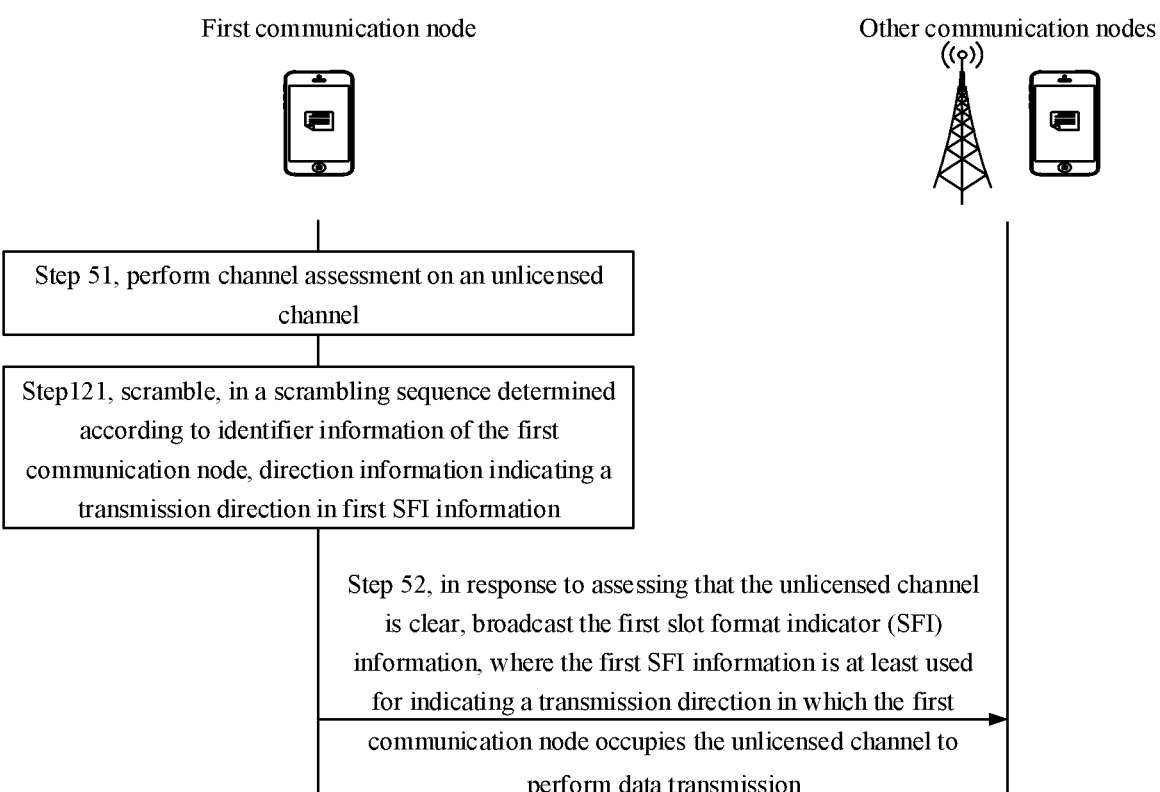
FIG. 12 is a schematic diagram of a method for indicating data transmission on an unlicensed spectrum channel provided in still yet another example of the disclosure.

As shown in FIG. 12, still yet another example of the disclosure further provides a method for indicating data transmission on an unlicensed spectrum channel. The step 111 that first SFI information is generated according to identifier information of a first communication node includes:

Step 121, direction information indicating the transmission direction in the first SFI information is scrambled in a scrambling sequence determined according to the identifier information of the first communication node.

In an example, identifier information of different communication nodes may correspond to different scrambling sequences. In this way, the second communication node may determine, in a scrambling sequence determined according to a result of descrambling the first SFI information, the identifier information of the first communication node.

Figure 13:
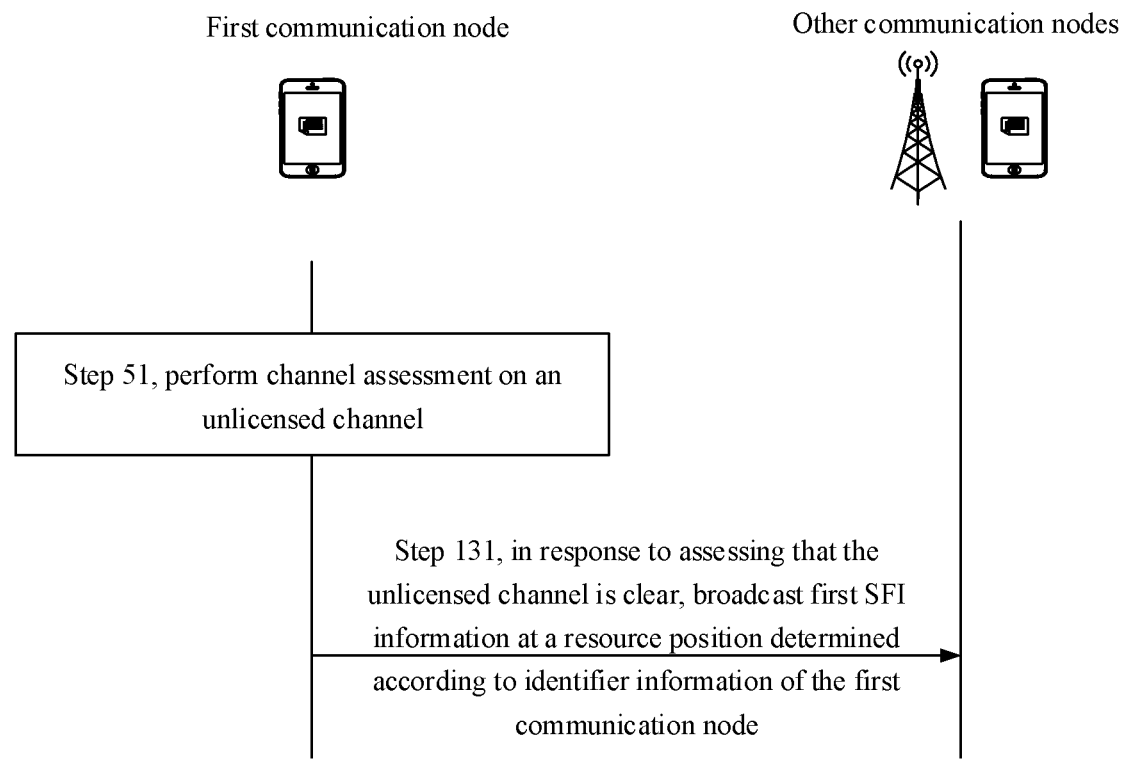
FIG. 13 is a schematic diagram of a method for indicating data transmission on an unlicensed spectrum channel provided in still yet another example of the disclosure.

As shown in FIG. 13, still yet another example of the disclosure further provides a method for indicating data transmission on an unlicensed spectrum channel. The step 52 that in response to assessing that the unlicensed channel is clear, first slot format indicator (SFI) information is broadcast includes:

Step 131, in response to assessing that the unlicensed channel is clear, the first SFI information is broadcast at a resource position determined according to the identifier information of the first communication node.

In an example, identifier information of different communication nodes may correspond to different resource positions. In this way, the second communication node may determine, according to the resource position at which the first communication node broadcasts the first SFI information, the identifier information of the first communication node.

As shown in FIG. 14, still yet another example of the disclosure further provides a method for indicating data transmission on an unlicensed spectrum channel. The method further includes:

Step 141, scheduling information sent by a second communication node according to the first SFI information is received.

In an example, after receiving the first SFI information, the second communication node configures transmission resources for the first communication node, and sends scheduling information including the transmission resources to the first communication node. Here, the transmission resources include radio time-frequency domain resources for data transmission. In an example, the scheduling information may be a time domain position and a frequency domain position indicating the time-frequency domain resources. After receiving the scheduling information, the first communication node may perform, based on the time domain position and the frequency domain position indicated by the scheduling information, data transmission.

Step 142, in response to the scheduling information including transmission resources configured for the first communication node, the data are transmitted on an unlicensed channel according to the scheduling information.

In an example, the first communication node transmits, based on the configured transmission resources, the data on the unlicensed channel.

In an example, the method further includes: in response to not receiving scheduling information sent by the second communication node according to the first SFI information, the data are not sent on the unlicensed channel.

In an example, the step that the first communication node does not receive the scheduling information sent by the second communication node according to the first SFI information may be that the second communication node does not configure the transmission resources for the first communication node.

In an example, the step that the data are not sent on the unlicensed channel may be that the data are not sent on the unlicensed channel, but are received on the unlicensed channel.

As shown in FIG. 15, an example of the disclosure further provides a method for indicating data transmission on an unlicensed spectrum channel. The method is applied to a second communication node and includes:

Step 151, first SFI information broadcast by a first communication node is received.

In an example, the first communication node may determine in advance with the second communication node a time-frequency domain position at which the first communication node broadcasts the first SFI information.

In an example, the first slot format indicator information may be broadcast at a time-frequency domain position notified by other communication nodes based on high layer signaling or physical layer signaling. In an example, the high layer signaling or the physical layer signaling may carry information indicating the time-frequency domain position.

In an example, the high layer signaling may be radio resource control (RRC) signaling, media access control element (MAC CE) signaling, etc.

In an example, the physical layer signaling may be physical downlink control channel (PDCCH) signaling.

Step 152, scheduling information for scheduling the first communication node to perform data transmission is sent according to the first SFI information.

In an example, after receiving the first SFI information, the second communication node configures transmission resources for the first communication node, and sends scheduling information including the transmission resources to the first communication node. Here, the transmission resources include radio time-frequency domain resources for data transmission. In an example, the scheduling information may be a time domain position and a frequency domain position indicating the time-frequency domain resources. After receiving the scheduling information, the first communication node may perform, based on the time domain position and the frequency domain position indicated by the scheduling information, data transmission.

In an example, the first SFI information is at least used for indicating a transmission direction in which the first communication node occupies an unlicensed channel to perform data transmission.

In an example, the first slot format indicator information is used for indicating a transmission direction of some or all of transmission units in which the first communication node occupies the unlicensed channel to perform data transmission.

In an example, some transmission units may be one or more of N transmission units. All the transmission units may be all of the N transmission units. Here, N is a positive integer greater than or equal to 1.

In an example, the first SFI information may indicate a transmission direction identifier of each transmission unit. The transmission direction identifier may be at least one of an "uplink" transmission direction identifier, a "downlink" transmission direction identifier, or an "undetermined" transmission direction identifier. For example, if identifier 1 is the uplink transmission direction identifier, and a transmission direction corresponding to identifier 1 is an uplink transmission direction, it means that a transmission direction of a transmission unit identified by identifier 1 is uplink transmission. If identifier 2 is the downlink transmission direction identifier, and a transmission direction corresponding to identifier 2 is a downlink transmission direction, it means that a transmission direction of a transmission unit identified by identifier 2 is downlink transmission. If identifier 3 is the "undetermined" transmission direction identifier, and a transmission direction corresponding to identifier 3 is an "undetermined" transmission direction, it means that a transmission direction of a transmission unit identified by identifier 3 is unknown.

In an example, in order to reduce interference, since some transmission units are required to avoid transmission of some special signals, a transmission direction of these transmission units may not be indicated, and data are not transmitted on these transmission units. Here, the special signal may be a cell reference signal.

In an example, one transmission unit may be, but is not limited to, a slot, a symbol, a sub-frame, and/or a radio frame, etc.

In an example, the transmission direction may be an "uplink" transmission direction, or a "downlink" transmission direction. Here, the "uplink" transmission direction may be an uplink transmission direction of data, and the "downlink" transmission direction may be a downlink transmission direction of data.

In an example, when the transmission direction is the "uplink" transmission direction, the first communication node may send data to the second communication node. When the transmission direction is the "downlink" transmission direction, the first communication node may receive data sent by the second communication node.

In an example, when data transmission is performed on the occupied unlicensed channel, different transmission units may have different transmission directions. For example, a transmission direction, on a first transmission unit, of data is the "uplink" transmission direction, and a transmission direction, on a second transmission unit, of data is the "downlink" transmission direction.

As shown in FIG. 16, an example of the disclosure further provides a method for indicating data transmission on an unlicensed spectrum channel. The method further includes:

Step 161, in response to occupying the unlicensed spectrum channel, second SFI information is broadcast, where the second SFI information is at least used for indicating a transmission direction in which the second communication node occupies an unlicensed channel to perform data transmission.

In an example, the second SFI information is used for indicating a transmission direction of some or all of transmission units in which the first communication node occupies the unlicensed channel to perform data transmission.

In an example, one transmission unit may be, but is not limited to, a slot, a symbol, a sub-frame, and/or a radio frame, etc.

In an example, the transmission direction may be an "uplink" transmission direction, or a "downlink" transmission direction. Here, the "uplink" transmission direction may be an uplink transmission direction of data, and the "downlink" transmission direction may be a downlink transmission direction of data.

In an example, when data transmission is performed on the occupied unlicensed channel, different transmission units may correspond to different transmission directions. For example, a transmission direction, on a first transmission unit, of data is the "uplink" transmission direction, and a transmission direction, on a second transmission unit, of data is the "downlink" transmission direction.

The step 151 that first SFI information broadcast by a first communication node is received includes:

Step 162, the first SFI information is received at a time domain position determined according to a time domain position at which the second SFI information is broadcast and offset.

In an example, the first communication node may determine in advance with the second communication node a time-frequency domain position at which the second communication node broadcasts the second SFI information.

In an example, the first communication node may determine the offset in advance with the second communication node.

In an example, the offset may be determined by the second communication node (for example, a base station). In an example, the base station determines the offset according to a condition of a transmission channel. In an example, when the transmission channel has a good signal quality, the offset is set as first offset; and when the transmission channel has a poor signal quality, the offset is set as second offset. Here, the first offset is smaller than the second offset. Here, the smaller the offset is, the faster the second communication node may acquire the first SFI information sent by the first communication node.

In an example, the offset may be with respect to the time domain position at which the second communication node broadcasts the second SFI information.

In an example, the step that the first SFI information is received at a time domain position determined according to a time domain position at which the second SFI information is broadcast and offset includes:

the first SFI information is received at a time domain position obtained by offsetting the time domain position at which the second SFI information is broadcast by the offset.

In an example, the time domain position at which the second communication node broadcasts the second SFI information may correspond to one transmission unit. Here, one transmission unit may be one symbol.

In an example, a time domain position before offsetting is a first time domain position, a time domain position offset by the offset is a second time domain position, and the first time domain position is separated from the second time domain position by a number of transmission units indicated by the offset. Here, one transmission unit may correspond to one symbol.

In an example, with reference to FIG. 7 again, a transmission unit corresponding to the time domain position at which the second communication node broadcasts the second SFI information is a first symbol. When the offset is 3, a symbol offset by 3 symbols is a fourth symbol, and a transmission unit for broadcasting the first SFI information is the fourth symbol.

In an example, the step that the first SFI information is received at a time domain position determined according to a time domain position at which the second SFI information is broadcast and offset includes:

the first SFI information is received in a time window obtained by offsetting the time domain position at which the second SFI information is broadcast by the offset, where the time window includes at least one candidate time domain position at which the first SFI information is broadcast.

In an example, at least one candidate time domain position may correspond to at least one transmission unit. Here, one transmission unit may be one symbol.

In an example, with reference to FIG. 8 again, the time window includes 3 symbols, the transmission unit corresponding to the time domain position at which the second communication node broadcasts the second SFI information is a first symbol, and when the offset is 3, symbols included in the time window offset by 3 symbols are a fourth symbol, a fifth symbol, and a sixth symbol in sequence.

In an example, at least one candidate time domain position includes three time domain positions. When assessing that the unlicensed channel is clear at a first time domain position, the first communication node broadcasts the first SFI information at the first time domain position. When assessing that the unlicensed channel is clear at a second time domain position, the first communication node broadcasts the first SFI information at the second time domain position. When assessing that the unlicensed channel is clear at a third time domain position, the first communication node broadcasts the first SFI information at the third time domain position.

Here, since the first communication node may broadcast the first SFI information at different time domain positions in one time window, compared with a manner in which the first SFI information may only be broadcast at a single time domain position, positions for broadcasting the first SFI information are increased, the situation that the first SFI may not be sent after the time domain position for broadcasting is missed is reduced, and the first SFI information may be broadcast in time. For example, the first communication node may select, according to a current transmission state and/or communication capability of the first communication node, one or more time domain positions in the time window, to broadcast the first SFI information. For example, if the first communication node has a high transceiving capability and a high transmission power currently, one time domain position may be selected according to the transmission condition for sending.

In an example, the first communication node may select any one of at least one candidate time domain position, to broadcast the first SFI information.

In an example, at least one candidate time domain position includes three time domain positions. When assessing that the unlicensed channel is busy at the first one of the three time domain positions, the first communication node does not broadcast the first SFI information at the first time domain position. When assessing that the unlicensed channel is clear at a second time domain position, the first communication node broadcasts the first SFI information at the second time domain position.

In an example, with reference to FIG. 9, the first communication node may broadcast the first SFI information repeatedly in a time period in which the unlicensed channel is occupied once. As shown in FIG. 9, the first SFI information is broadcast on the fourth symbol and the (X+3)th symbol. X is a positive integer greater than 8.

In an example, the method further includes:

in response to determining that the first SFI information broadcast by the first communication node is not received, transmission resources of the unlicensed channel are not scheduled for the first communication node before the second communication node rebroadcasts the second SFI information.

In an example, if not receiving the first SFI information, the second communication node does not configure transmission resources for the first communication node. Here, the transmission resources include radio time-frequency domain resources for data transmission. In an example, the transmission resources may be a time domain position and a frequency domain position indicating the time-frequency domain resources. After receiving the scheduling information, the first communication node may perform, based on the time domain position and the frequency domain position indicated by the scheduling information, data transmission.

As shown in FIG. 17, an example of the disclosure further provides a method for indicating data transmission on an unlicensed spectrum channel. The method further includes:

Step 171, time-frequency domain information is sent.

In an example, high layer signaling or physical layer signaling carrying time-frequency domain information may be sent.

In an example, the high layer signaling may be radio resource control (RRC) signaling, media access control element (MAC CE) signaling, etc.

In an example, the physical layer signaling may be physical downlink control channel (PDCCH) signaling.

In an example, the time-frequency domain information may be carried in second SFI information sent by a second communication node to a first communication node.

In an example, the time-frequency domain information includes time domain position information and frequency domain position information.

The step 151 that first SFI information broadcast by a first communication node is received includes:

Step 172, the first SFI information broadcast by the first communication node is received at a time-frequency resource position indicated by the time-frequency domain information.

In an example, with reference to FIG. 10*a* again, the time-frequency domain information indicates that the second communication node sends the second SFI information on a first symbol, and the time-frequency position information in the time-frequency domain information may indicate any X1th symbol among symbols after the first symbol. In an example, the frequency domain position information in the time-frequency domain information may indicate any sub-carrier corresponding to the X1th symbol. X1 is a positive integer greater than 1.

In an example, with reference to FIG. 10*b* again, the time-frequency domain information indicates that the second communication node sends the second SFI information on a first symbol, and the time domain position information in the time-frequency domain information may indicate n symbols among symbols after the first symbol. In an example, the frequency domain position information in the time-frequency domain information may indicate any sub-carrier corresponding to each of the n symbols. In an example, n may be n consecutive symbols or n non-consecutive symbols. n is a positive integer greater than 1.

In an example, the method further includes:

identifier information of the first communication node is determined according to the first SFI information.

In an example, the identifier information is used for distinguishing between different communication nodes. For example, an identifier of the first communication node is "001", and an identifier of the second communication node is "010".

In an example, the first SFI information may carry the identifier information of the first communication node. In an example, the identifier of the first communication node may be characterized by a plurality of bits of physical layer signaling carrying the SFI information. For example, the identifier of the first communication node is characterized by 3 bits. When set as "001", the bits characterize the identifier of the first communication node.

In an example, the first SFI information includes:

direction information used for indicating a transmission direction in which the first communication node occupies an unlicensed channel to perform data transmission; and In an example, the transmission direction may be an "uplink" transmission direction, or a "downlink" transmission direction. Here, the "uplink" transmission direction may be an uplink transmission direction of data, and the "downlink" transmission direction may be a downlink transmission direction of data.

In an example, when data are transmitted on the occupied unlicensed channel, a transmission direction, on a first transmission unit, of data is the "uplink" transmission direction, and a transmission direction, on a second transmission unit, of data is the "downlink" transmission direction.

identifier information used for indicating the first communication node.

In an example, the identifier information is used for distinguishing between different communication nodes.

In an example, the method further includes:

Step 181, the identifier information of the first communication node is determined in a scrambling sequence determined according to a result of descrambling the first SFI information.

In an example, identifier information of different communication nodes may correspond to different scrambling sequences. In this way, the second communication node may determine, in the scrambling sequence determined according to the result of descrambling the first SFI information, the identifier information of the first communication node.

In an example, the method further includes:

Step 191, the identifier information of the first communication node is determined according to a resource position at which the first communication node broadcasts the first SFI information.

In an example, identifier information of different communication nodes may correspond to different resource positions. In this way, the second communication node may determine, according to the resource position at which the first communication node broadcasts the first SFI information, the identifier information of the first communication node.

As shown in FIG. 18, an example of the disclosure further provides a method for indicating data transmission on an unlicensed spectrum channel. The method is applied to a third communication node and includes:

Step 201, first SFI information broadcast by a first communication node is received, where the first SFI information is at least used for indicating a transmission direction in which the first communication node occupies an unlicensed channel to perform data transmission, and the first communication node and the third communication node belong to different cells.

In an example, the first communication node belongs to a first cell, and the third communication node belongs to a second cell. The first cell is different from the second cell.

In an example, the first communication node may be a terminal or a base station.

In an example, the terminal may be, but is not limited to, a mobile phone, a wearable device, a vehicle-mounted terminal, a smart home terminal, an industrial sensing device, and/or a medical device, etc.

In an example, the first slot format indicator information is used for indicating a transmission direction of some or all of transmission units in which the first communication node occupies the unlicensed channel to perform data transmission.

In an example, one transmission unit may be, but is not limited to, a slot, a symbol, a sub-frame, and/or a radio frame, etc.

In an example, the transmission direction may be an "uplink" transmission direction, or a "downlink" transmission direction. Here, the "uplink" transmission direction may be an uplink transmission direction of data, and the "downlink" transmission direction may be a downlink transmission direction of data.

In an example, when the first communication node occupies the unlicensed channel to perform data transmission, different transmission units may correspond to different transmission directions. For example, a transmission direction, on a first transmission unit, of data is the "uplink" transmission direction, and a transmission direction, on a second transmission unit, of data is the "downlink" transmission direction.

Step 202, a backoff operation is performed based on the first SFI information.

In an example, the third communication node performs the backoff operation in the transmission direction indicated by the first SFI information.

In an example, the step that a backoff operation is performed may be stopping data transmission. In an example, stopping data transmission may be stopping sending data, or stopping receiving data, or stopping both receiving and sending data.

As shown in FIG. 19, an example of the disclosure further provides a method for indicating data transmission on an unlicensed spectrum channel. The step 192 that a backoff operation is performed based on the first SFI information includes:

Step 301, in response to a time period in which a transmission direction indicated by the first SFI information is a downlink transmission direction, a data sending operation is not performed; and alternatively, in response to a time period in which a transmission direction indicated by the first SFI information is an uplink transmission direction, a data reception operation is not performed.

In an example, a time period may include a plurality of transmission units, and all transmission units have the same data transmission direction.

In an example, transmission directions in different time periods are different.

Here, the third communication node does not perform the data sending operation in the time period in which the transmission direction indicated by the first SFI information is the downlink transmission direction, so that interference, generated by a signal sent by the third communication node, to data reception by the first communication node may be reduced. Moreover, the third communication node may perform the data reception operation in the time period in which the transmission direction indicated by the first SFI information is the downlink transmission direction. Compared with the case that the data are not transmitted in time periods of downlink transmission and uplink transmission by the first communication node, and utilization efficiency of radio resources is improved.

Here, the third communication node does not perform the data reception operation in the time period in which the transmission direction indicated by the first SFI information is the uplink transmission direction, so that the interference, generated by a signal sent by the first communication node, to data reception by the third communication node may be reduced. Moreover, the third communication node may perform the data sending operation in the time period in which the transmission direction indicated by the first SFI information is the uplink transmission direction. Compared with the case that data are not transmitted in time periods of downlink transmission and uplink transmission by the first communication node, and utilization efficiency of radio resources is improved.

Figure 20:
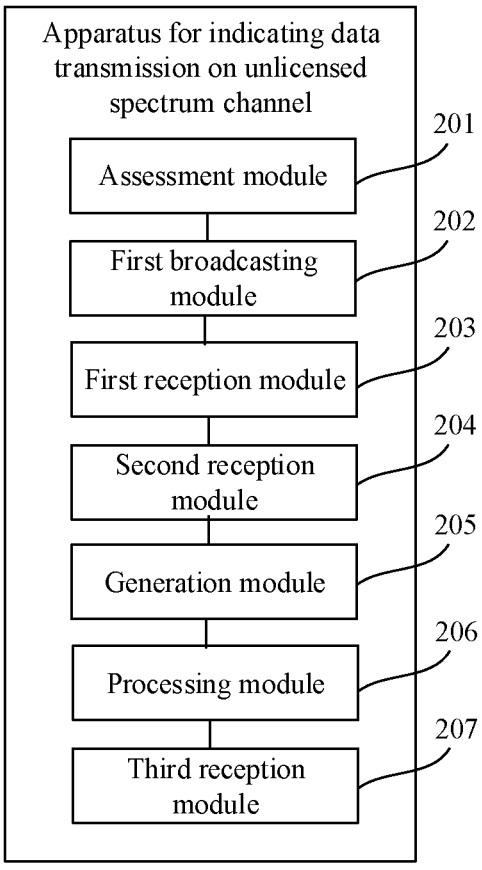
FIG. 20 is a schematic diagram of an apparatus for indicating data transmission on an unlicensed spectrum channel provided in an example of the disclosure.

As shown in FIG. 20, an example of the disclosure provides an apparatus for indicating data transmission on an unlicensed spectrum channel. The apparatus is applied to a first communication node and includes an assessment module 201 and a first broadcasting module 202, the assessment module 201 being configured to perform channel assessment on an unlicensed channel, and the first broadcasting module 202 being configured to broadcast first slot format indicator (SFI) information in response to assessing that the unlicensed channel is clear, where the first SFI information is at least used for indicating a transmission direction in which the first communication node occupies the unlicensed channel to perform data transmission.

In an example, the apparatus further includes a first reception module 203, the first reception module 203 being configured to receive second SFI information broadcast by a second communication node; and the first broadcasting module 202 is further configured to broadcast the first SFI information at a time domain position determined according to a time domain position at which the second communication node broadcasts the second SFI information and offset.

In an example, the first broadcasting module 202 is further configured to:

broadcast the first SFI information at a time domain position obtained by offsetting the time domain position at which the second communication node broadcasts the second SFI information by the offset; and alternatively, broadcast the first SFI information in a time window obtained by offsetting the time domain position at which the second communication node broadcasts the second SFI information by the offset. The time window encompasses at least one candidate time domain position at which the first SFI information is broadcast.

In an example, the apparatus further includes a second reception module 204, the second reception module 204 being configured to receive time-frequency domain information sent by a second communication node; and the first broadcasting module 202 is further configured to broadcast the first SFI information at a time-frequency resource position indicated by the time-frequency domain information.

In an example, the apparatus further includes a generation module 205, the generation module 205 being further configured to generate the first SFI information according to identifier information of the first communication node, where the first SFI information is further used for the second communication node to determine a communication node to undergo resource scheduling.

In an example, the generation module 205 is further configured to: the first SFI information includes:

direction information used for indicating a transmission direction in which the first communication node occupies an unlicensed channel to perform data transmission; and identifier information used for indicating the first communication node.

In an example, the generation module 205 is further configured to scramble, in a scrambling sequence determined according to the identifier information of the first communication node, the direction information indicating the transmission direction in the first SFI information.

In an example, the first broadcasting module 202 is further configured to broadcast the first SFI information at a resource position determined according to the identifier information of the first communication node in response to assessing that the unlicensed channel is clear.

In an example, the apparatus further includes a processing module 206 and a third reception module 207, the third reception module 207 being further configured to receive scheduling information sent by the second communication node according to the first SFI information, and the processing module 206 being configured to transmit, according to the scheduling information, the data on the unlicensed channel in response to the scheduling information includes transmission resources configured for the first communication node.

In an example, the processing module 206 is further configured to:

not send the data on the unlicensed channel in response to not receiving scheduling information sent by a second communication node according to the first SFI information.

Figure 21:
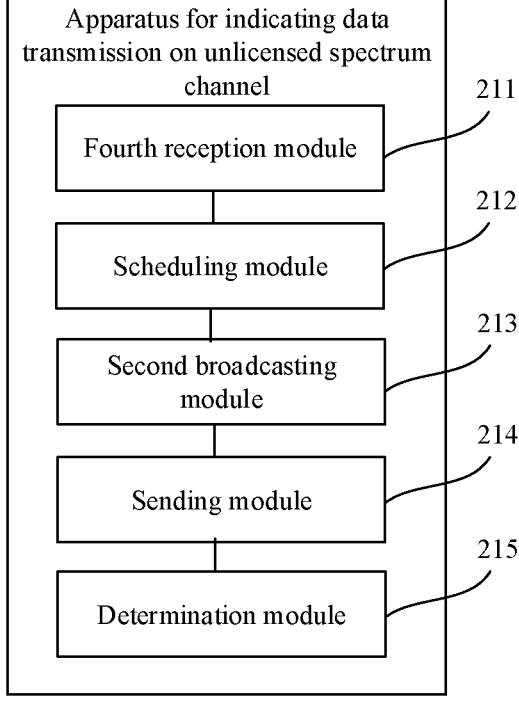
FIG. 21 is a schematic diagram of an apparatus for indicating data transmission on an unlicensed spectrum channel provided in another example of the disclosure.

As shown in FIG. 21, an example of the disclosure provides an apparatus for indicating data transmission on an unlicensed spectrum channel. The apparatus is applied to a second communication node and includes a fourth reception module 211 and a scheduling module 212, the fourth reception module 211 being configured to receive first SFI information broadcast by a first communication node, and the scheduling module 212 being configured to send, according to the first SFI information, scheduling information for scheduling the first communication node to perform data transmission.

In an example, the fourth reception module 211 is further configured to: the first SFI information is at least used for indicating a transmission direction in which the first communication node occupies an unlicensed channel to perform data transmission.

In an example, the apparatus further includes a second broadcasting module 213, the second broadcasting module 213 being configured to broadcast second SFI information in response to occupying the unlicensed spectrum channel, where the second SFI information is at least used for indicating a transmission direction in which the second communication node occupies an unlicensed channel to perform data transmission; and the fourth reception module 211 is further configured to receive the first SFI information at a time domain position determined according to a time domain position at which the second SFI information is broadcast and offset.

In an example, the fourth reception module 211 is further configured to:

receive the first SFI information at a time domain position obtained by offsetting the time domain position at which the second SFI information is broadcast by the offset; and alternatively, receive the first SFI information in a time window obtained by offsetting the time domain position at which the second SFI information is broadcast by the offset, where the time window includes at least one candidate time domain position at which the first SFI information is broadcast.

In an example, the scheduling module 212 is further configured to:

in response to determining that the first SFI information broadcast by the first communication node is not received, not schedule transmission resources of the unlicensed channel for the first communication node before the second communication node rebroadcasts the second SFI information.

In an example, the apparatus further includes a sending module 214, the sending module 214 being configured to send time-frequency domain information; and the fourth reception module 211 is further configured to receive the first SFI information broadcast by the first communication node at a time-frequency resource position indicated by the time-frequency domain information.

In an example, the apparatus further includes a determination module 215, the determination module 215 being configured to determine, according to the first SFI information, identifier information of the first communication node.

In an example, the determination module 215 is further configured to: the first SFI information includes:

direction information used for indicating a transmission direction in which the first communication node occupies an unlicensed channel to perform data transmission; and identifier information used for indicating the first communication node.

In an example, the determination module 215 is further configured to:

determine, in a scrambling sequence determined according to a result of descrambling the first SFI information, the identifier information of the first communication node.

In an example, the determination module 215 is further configured to:

determine, according to a resource position at which the first communication node broadcasts the first SFI information, the identifier information of the first communication node.

Figures 22, 23:
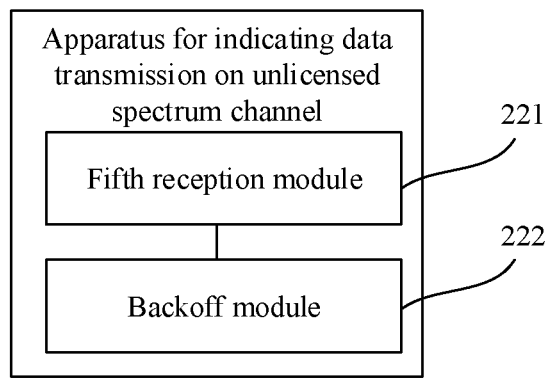
FIG. 22 is a schematic diagram of an apparatus for indicating data transmission on an unlicensed spectrum channel provided in still another example of the disclosure.
FIG. 23 is a schematic structural diagram of a terminal provided in an example of the disclosure.

As shown in FIG. 22, an example of the disclosure provides an apparatus for indicating data transmission on an unlicensed spectrum channel. The apparatus is applied to a third communication node and includes a fifth reception module 221 and a backoff module 222, the fifth reception module 221 being configured to: receive first SFI information broadcast by a first communication node, where the first SFI information is at least used for indicating a transmission direction in which the first communication node occupies an unlicensed channel to perform data transmission, and the first communication node and the third communication node belong to different cells, and the backoff module 222 being configured to perform, based on the first SFI information, a backoff operation.

In an example, the backoff module 222 is further configured to:

not perform a data sending operation in response to a time period in which a transmission direction indicated by the first SFI information is a downlink transmission direction; and alternatively, not perform a data reception operation in response to a time period in which a transmission direction indicated by the first SFI information is an uplink transmission direction.

An example of the disclosure further provides a communication device, including:

an antenna;

a memory; and a processor connected to the antenna and the memory separately, used for controlling the antenna to receive and send radio signals by executing an executable program stored on the memory, and capable of executing steps of the method for indicating data transmission on an unlicensed spectrum channel provided in any one of the foregoing examples.

The communication device provided in the example may be the foregoing terminal or base station. The terminal may be any one of various wearable terminals or vehicle-mounted terminals. The base station may be any one of various types of base stations, such as a 4G base station or a 5G base station, etc.

The antenna may be any one of various types of antennas, for example, mobile antennas such as a 3G antenna, 4G antenna or 5G antenna, etc. The antenna may further be a WiFi antenna or a radio charging antenna, etc.

The memory may include various types of storage media. The storage media are non-transitory computer storage media that may continue to remember information stored after the communication device is powered off.

The processor may be connected to the antenna and the memory through a bus, etc. for reading the executable program stored on the memory, for example, at least one of the methods shown in any example of the disclosure.

An example of the disclosure further provides a non-transitory computer-readable storage medium, the non-transitory computer-readable storage medium storing an executable program, when executed by a processor, the executable program implementing steps of the method for indicating data transmission on an unlicensed spectrum channel provided in any one of the foregoing examples, for example, at least one of the methods shown in any example of the disclosure.

As shown in FIG. 23, an example of the disclosure provides a structure of a terminal.

With reference to the terminal 800 shown in FIG. 23, the example provides the terminal 800. Specifically, the terminal may be a mobile phone, a computer, a digital broadcast terminal, a message transceiving device, a game console, a tablet device, a medical device, a fitness device, a personal digital assistant, etc.

With reference to FIG. 23, the terminal 800 may include one or more of the following assemblies: a processing assembly 802, a memory 804, a power supply assembly 806, a multimedia assembly 808, an audio assembly 810, an interface 812 for input/output (I/O), a sensor assembly 814, and a communication assembly 816.

Generally, the processing assembly 802 controls an overall operation of the terminal 800, such as operations associated with display, telephone calls, data communication, a camera operation, and a recording operation. The processing assembly 802 may include one or more processors 820, to execute instructions, so as to complete all or some of steps of the methods described above. In addition, the processing assembly 802 may include one or more modules that facilitate interaction between the processing assembly 802 and other assemblies. For example, the processing assembly 802 may include a multimedia module, to facilitate interaction between the multimedia assembly 808 and the processing assembly 802.

The memory 804 is configured to store various types of data, to support the operations at the device 800. For example, these data include instructions of any application or method operated on the terminal 800, contact data, phonebook data, messages, pictures, videos, etc. The memory 804 may be implemented through any type or combination of volatile or non-volatile memory devices, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power supply assembly 806 provides power for various assemblies of the terminal 800. The power supply assembly 806 may include a power supply management system, one or more power supplies, and other assemblies associated with power generating, managing, and distributing for the terminal 800.

The multimedia assembly 808 includes a screen that provides an output interface between the terminal 800 and a user. In some examples, the screen may include a liquid crystal display (LCD) and a touch panel (TP). With the touch panel included, the screen may be implemented as a touch screen, to receive an input signal from the user. The touch panel includes one or more touch sensors, to sense touches, swipes, and gestures on the touch panel. Except for sensing a boundary of a touch or swipe action, the touch sensor may also assess a duration and a pressure associated with touch or swipe operations. In some examples, the multimedia assembly 808 includes a front-facing camera and/or a rear-facing camera. When the device 800 is in an operation mode, such as a photographing mode or a video mode, the front-facing camera and/or the rear-facing camera may receive external multimedia data. Each of the front-facing camera and the rear-facing camera may be a fixed optical lens system or have focal length and optical zoom capacities.

The audio assembly 810 is configured to output and/or inputting audio signals. For example, the audio assembly 810 includes a microphone (MIC) configured to receive an external audio signal when the terminal 800 is in operation modes, such as a call mode, a recording mode, and a voice recognition mode. The received audio signal may be further stored in the memory 804 or sent via the communication assembly 816. In some examples, the audio assembly 810 further includes a speaker for outputting the audio signal.

The interface 812 for I/O provides an interface between the processing assembly 802 and a peripheral interface module, such as a keyboard, a click wheel, a button, etc. These button may include, but are not limited to, a home button, a volume button, a start button, and a lock button.

The sensor assembly 814 includes one or more sensors for providing state assessments of various aspects of the terminal 800. For example, the sensor assembly 814 may assess an opened/closed state of the device 800, and relative positioning of assemblies such as a display and keypad of the terminal 800. The sensor assembly 814 may further assess a change in position of the terminal 800 or one assembly of the terminal 800, a presence or not of contact between the user and the terminal 800, orientation or acceleration/deceleration of the terminal 800, and a change in temperature of the terminal 800. The sensor assembly 814 may include a proximity sensor configured for assessing the presence of a nearby object in the absence of any physical contact. The sensor assembly 814 may further include a light sensor, such as a complementary metal oxide semiconductor (CMOS) or a charged coupled device (CCD) image sensor for imaging applications. In some examples, the sensor assembly 814 may further include an acceleration sensor, a gyroscopic sensor, a magnetic sensor, a pressure sensor, or a temperature sensor.

The communication assembly 816 is configured to facilitate wired or radio communication between the terminal 800 and other devices. The terminal 800 may access a radio network based on a communication standard, such as Wi-Fi, 2G or 3G, or their combinations. In an example, the communication assembly 816 receives a broadcast signal or broadcast related information from an external broadcast management system via a broadcast channel. In an example, the communication assembly 816 further includes a near field communication (NFC) module, to facilitate short-distance communication. For example, the NFC module may be implemented based on a radio frequency identification (RFID) technology, an infrared data association (IrDA) technology, an ultra wide band (UWB) technology, a Bluetooth (BT) technology, etc.

In an example, the terminal 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, etc., for executing the methods described above.

In an example, further provided is a non-transitory computer-readable storage medium including instructions, for example, a memory 804 including instructions which are executable by a processor 820 of a terminal 800, to complete the methods described above. For example, the non-transitory computer-readable storage medium may be an ROM, a random access memory (RAM), a compact disk (CD)-ROM, a magnetic tape, a floppy disk, an optical data storage device, etc.

The terminal may be used for implementing the foregoing methods, for example, the method in any example of the disclosure.

Figure 24:
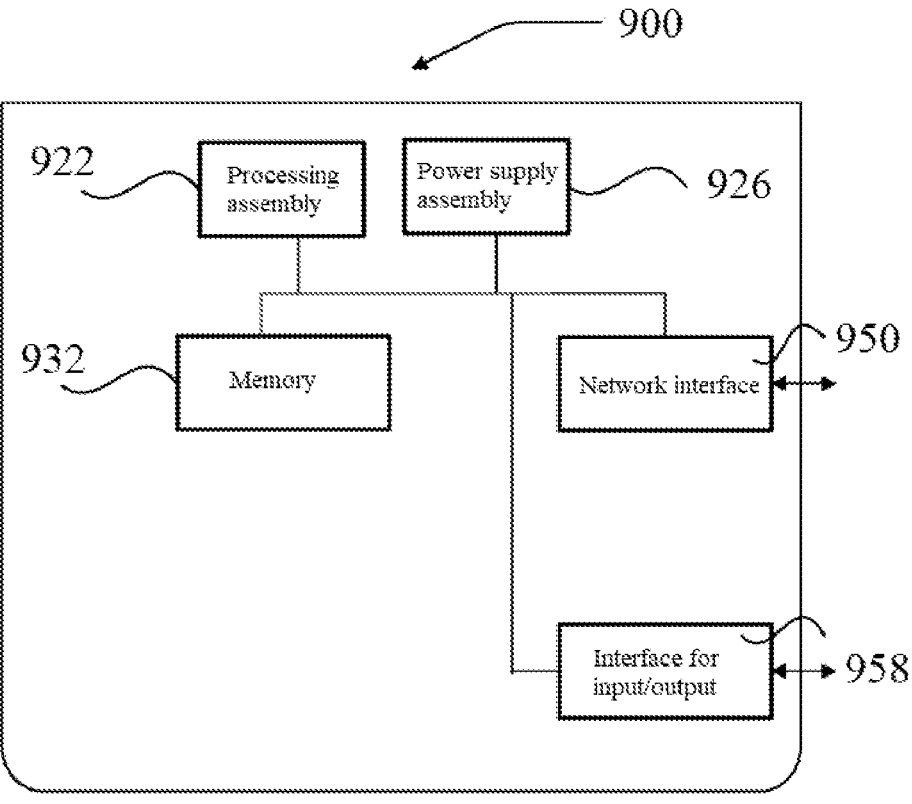
FIG. 24 is a schematic structural diagram of a base station provided in an example of the disclosure.

As shown in FIG. 24, an example of the disclosure provides a structure of a base station. For example, the base station 900 may be provided as a network-side device. With reference to FIG. 24, the base station 900 includes a processing assembly 922, and further includes one or more processors, and a memory resource represented by a memory 932 for storing instructions, such as applications that are executable by the processing assembly 922. The applications stored in the memory 932 may include one or more modules, each of which corresponds to a set of instructions. In addition, the processing assembly 922 is configured to execute the instructions, to execute any one the foregoing methods, for example, the method in any example of the disclosure.

The base station 900 may further include a power supply assembly 926 configured to execute power supply management of the base station 900, a wired or radio network interface 950 configured to connect the base station 900 to a network, and an interface 958 for input/output (I/O). The base station 900 may operate based on an operation system stored in the memory 932, such as Windows Server™, Mac OS X™, Unix™, Linux™, FreeBSD™, etc.

The radio network interface 950 includes, but is not limited to, the antenna of the forgoing communication device. Other implementation solutions to the disclosure will be easily conceived by those skilled in the art in consideration of the description and practice of the disclosure disclosed here. The disclosure is intended to cover any variations, uses or adaptive changes of the disclosure, which follow the general principles of the disclosure and include common general knowledge or conventional technical means, which is not disclosed in the disclosure, in the art. The description and the examples are to be deemed as illustrative only, and the true scope and spirit of the disclosure are indicated by the following claims.

It is to be understood that the disclosure is not limited to a precise structure which has been described above and shown in the accompanying drawings, and may have various modifications and changes without departing from the its scope. The scope of the disclosure is limited by the appended claims only.

The invention claimed is:

1. A method for indicating data transmission on an unlicensed spectrum channel, performed by a first communication node, the method comprising:

receiving second slot format indicator (SFI) information broadcast by a second communication node, wherein the second SFI information is at least used for indicating a transmission direction in which the second communication node occupies an unlicensed channel to perform data transmission;

performing channel assessment on the unlicensed channel;

assessing that the unlicensed channel is clear; and broadcasting first SFI information, wherein the first SFI information is at least used for indicating a transmission direction in which the first communication node occupies the unlicensed channel to perform data transmission;

wherein broadcasting the first SFI information comprises:

broadcasting the first SFI information at a time domain position determined according to a time domain position at which the second communication node broadcasts the second SFI information and an offset;

wherein broadcasting the first SFI information at the time domain position determined according to the time domain position at which the second communication node broadcasts the second SFI information and the offset comprises:

broadcasting the first SFI information in a time window obtained by offsetting the time domain position at which the second communication node broadcasts the second SFI information by the offset, wherein the time window comprises at least one candidate time domain position at which the first SFI information is broadcast.

2. The method according to claim 1, further comprising:

receiving time-frequency domain information sent by the second communication node; wherein broadcasting the first SFI information comprises:

broadcasting the first SFI information at a time-frequency resource position indicated by the time-frequency domain information.

3. The method according to claim 1, further comprising:

generating the first SFI information according to identifier information of the first communication node, wherein the first SFI information is further used for the second communication node to determine a communication node to undergo resource scheduling, wherein the first SFI information comprises:

direction information used for indicating the transmission direction in which the first communication node occupies the unlicensed channel to perform data transmission; and identifier information used for indicating the first communication node.

4. The method according to claim 3, wherein generating the first SFI information according to identifier information of the first communication node comprises:

scrambling, in a scrambling sequence determined according to the identifier information of the first communication node, direction information indicating the transmission direction in the first SFI information.

5. The method according to claim 3, further comprising:

broadcasting the first SFI information at a resource position determined according to the identifier information of the first communication node.

6. The method according to claim 1, further comprising:

receiving scheduling information sent by the second communication node according to the first SFI information;

transmitting, according to the scheduling information, the data on the unlicensed channel, wherein the scheduling information comprises transmission resources configured for the first communication node; or skipping receiving scheduling information sent by the second communication node according to the first SFI information, and skipping sending data on the unlicensed channel.

7. A method for indicating data transmission on an unlicensed spectrum channel, performed by a second communication node, the method comprising:

occupying the unlicensed spectrum channel;

broadcasting second slot format indicator (SFI) information, wherein the second SFI information is at least used for indicating a transmission direction in which the second communication node occupies an unlicensed channel to perform data transmission;

receiving first SFI information broadcast by a first communication node; and sending, according to the first SFI information, scheduling information for scheduling the first communication node to perform data transmission;

wherein receiving the first SFI information broadcast by the first communication node comprises:

receiving the first SFI information at a time domain position determined according to a time domain position at which the second SFI information is broadcast and an offset;

wherein receiving the first SFI information at the time domain position determined according to the time domain position at which the second SFI information is broadcast and the offset comprises:

receiving the first SFI information in a time window obtained by offsetting the time domain position at which the second SFI information is broadcast by the offset, wherein the time window comprises at least one candidate time domain position at which the first SFI information is broadcast.

8. The method according to claim 7, further comprising:

determining that the first SFI information broadcast by the first communication node is not received; and skipping scheduling transmission resources of the unlicensed channel for the first communication node before the second communication node rebroadcasts the second SFI information.

9. The method according to claim 7, further comprising:

sending time-frequency domain information, wherein receiving the first SFI information broadcast by the first communication node comprises:

receiving the first SFI information broadcast by the first communication node at a time-frequency resource position indicated by the time-frequency domain information.

10. The method according to claim 7, further comprising:

determining, according to the first SFI information, identifier information of the first communication node;

wherein the first SFI information comprises:

direction information used for indicating a transmission direction in which the first communication node occupies the unlicensed spectrum channel to perform data transmission; and the identifier information used for indicating the first communication node.

11. The method according to claim 10, further comprising:

determining, in a scrambling sequence determined according to a result of descrambling the first SFI information, the identifier information of the first communication node.

12. The method according to claim 10, further comprising:

determining, according to a resource position at which the first communication node broadcasts the first SFI information, the identifier information of the first communication node.

13. A method for indicating data transmission on an unlicensed spectrum channel, performed by a third communication node, the method comprising:

receiving first slot format indicator (SFI) information broadcast by a first communication node, wherein the first SFI information is at least used for indicating a transmission direction in which the first communication node occupies an unlicensed channel to perform data transmission, and the first communication node and the third communication node belong to different cells; and performing, based on the first SFI information, a backoff operation;

wherein the first SFI information is broadcast, at a time domain position determined according to a time domain position at which a second communication node broadcasts second SFI information and an offset, by the first communication node, and the second SFI information is at least used for indicating a transmission direction in which the second communication node occupies the unlicensed channel to perform data transmission; and wherein the first SFI information is broadcast in a time window obtained by offsetting the time domain position at which the second communication node broadcasts the second SFI information by the offset, wherein the time window comprises at least one candidate time domain position at which the first SFI information is broadcast.

14. The method according to claim 13, wherein the performing, based on the first SFI information, the backoff operation comprises at least one of:

in response to a time period in which the transmission direction indicated by the first SFI information is a downlink transmission direction, not performing a data sending operation; or in response to a time period in which the transmission direction indicated by the first SFI information is an uplink transmission direction, not performing a data reception operation.

15. A communication device, comprising:

an antenna;

a memory; and a processor connected to the antenna and the memory separately, configured to control transceiving of the antenna by executing a computer-executable instruction stored on the memory, and capable of implementing the method provided by claim 1.

16. A non-transitory computer storage medium, storing a computer-executable instruction, and the computer-executable instruction being capable of implementing the method provided in claim 1 after being executed by a processor.

17. The method according to claim 1, wherein broadcasting the first SFI information at the time domain position determined according to the time domain position at which the second communication node broadcasts the second SFI information and the offset further comprises:

broadcasting the first SFI information at a time domain position obtained by offsetting the time domain position at which the second communication node broadcasts the second SFI information by the offset.

18. The method according to claim 7, wherein receiving the first SFI information at the time domain position determined according to the time domain position at which the second SFI information is broadcast and the offset further comprises:

receiving the first SFI information at a time domain position obtained by offsetting the time domain position at which the second SFI information is broadcast by the offset.

19. The method according to claim 13, wherein the first SFI information is broadcast at a time domain position obtained by offsetting the time domain position at which the second communication node broadcasts the second SFI information by the offset.

* * * * *